(12) United States Patent
Petersen

(10) Patent No.: US 8,411,404 B2
(45) Date of Patent: Apr. 2, 2013

(54) OVERVOLTAGE PROTECTION PLUG

(75) Inventor: Cyle D. Petersen, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 190 days.

(21) Appl. No.: 12/473,087

(22) Filed: May 27, 2009

(65) Prior Publication Data

US 2009/0296303 A1 Dec. 3, 2009

Related U.S. Application Data

(60) Provisional application No. 61/056,328, filed on May 27, 2008.

(51) Int. Cl.
*H02H 1/00* (2006.01)
*H02H 3/22* (2006.01)

(52) U.S. Cl. ...................... 361/120; 361/111

(58) Field of Classification Search .............. 361/120, 361/111
See application file for complete search history.

(56) References Cited

U.S. PATENT DOCUMENTS

| | | | |
|---|---|---|---|
| D215,545 S | 10/1969 | Huska | |
| 4,086,648 A | 4/1978 | Hines et al. | |
| 4,345,294 A | 8/1982 | Forberg et al. | |
| 4,420,200 A | 12/1983 | Forberg et al. | |
| 4,420,892 A | 12/1983 | Braun et al. | |
| D273,104 S | 3/1984 | Cousins | |
| 4,434,542 A | 3/1984 | Forberg et al. | |
| 4,502,088 A | 2/1985 | Baumbach | |
| 4,594,635 A | 6/1986 | Scheithauer et al. | |
| 4,626,955 A | 12/1986 | Cwirzen | |
| 4,642,723 A | 2/1987 | Achtnig et al. | |
| 4,649,456 A | 3/1987 | De Luca et al. | |
| 4,741,711 A | 5/1988 | Singer, Jr. | |
| 4,759,726 A | 7/1988 | Naylor et al. | |
| 4,871,330 A | 10/1989 | Muller et al. | |
| 4,882,748 A | 11/1989 | Meyerhoefer | |
| 4,887,183 A | 12/1989 | Biederstedt et al. | |
| 4,958,253 A | 9/1990 | Gilberts et al. | |
| 4,964,160 A | 10/1990 | Traube et al. | |
| 4,986,768 A | 1/1991 | Bramkamp et al. | |

(Continued)

FOREIGN PATENT DOCUMENTS

| CA | 1333409 | 12/1994 |
|---|---|---|
| DE | 37 28 368 C1 | 11/1988 |

(Continued)

OTHER PUBLICATIONS

International Search Report and Written Opinion mailed Jul. 10, 2008 for International Application No. PCT/US2008/054747; filed Feb. 22, 2008.

(Continued)

*Primary Examiner* — Jared Fureman
*Assistant Examiner* — Lucy Thomas
(74) *Attorney, Agent, or Firm* — Merchant & Gould P.C.

(57) ABSTRACT

An overvoltage protection plug is disclosed. The overvoltage protection plug includes a protection plug body formed from a chassis and a housing and defining an interior volume, the protection plug body including an insertion portion and a handle. The overvoltage protection plug further includes a gas tube located within the interior volume, the gas tube electrically connected to metallic leads protruding through the body at the insertion portion. The overvoltage protection plug also includes a grounding plate electrically connected to a ground pin of the gas tube.

34 Claims, 45 Drawing Sheets

U.S. PATENT DOCUMENTS

| | | | |
|---|---|---|---|
| 5,033,974 A | 7/1991 | Biederstedt et al. |
| 5,086,368 A | 2/1992 | Gerke et al. |
| 5,155,649 A | 10/1992 | Hung et al. |
| 5,155,650 A | 10/1992 | Pitsch et al. |
| 5,157,580 A | 10/1992 | Hegner et al. |
| 5,163,855 A | 11/1992 | Gerke et al. |
| 5,172,295 A | 12/1992 | Hegner et al. |
| 5,187,634 A | 2/1993 | Pitsch et al. |
| 5,248,953 A | 9/1993 | Hönl |
| 5,299,088 A | 3/1994 | Hönl et al. |
| 5,341,269 A | 8/1994 | Hayward et al. |
| 5,357,568 A | 10/1994 | Pelegris |
| 5,369,543 A | 11/1994 | Bonnesen et al. |
| 5,371,648 A | 12/1994 | Bonvallat |
| D354,940 S | 1/1995 | Speiser et al. |
| 5,398,152 A | 3/1995 | Borkowicz et al. |
| 5,410,443 A | 4/1995 | Pelegris |
| 5,494,461 A | 2/1996 | Bippus et al. |
| 5,546,267 A | 8/1996 | Frederiksen et al. |
| 5,555,153 A | 9/1996 | Frederiksen et al. |
| 5,557,065 A * | 9/1996 | Brower et al. ............ 174/564 |
| 5,574,614 A | 11/1996 | Busse et al. |
| 5,574,615 A | 11/1996 | Busse et al. |
| 5,596,475 A | 1/1997 | Figueiredo et al. |
| 5,627,721 A | 5/1997 | Figueiredo et al. |
| 5,808,849 A | 9/1998 | Storbeck |
| D402,628 S | 12/1998 | Canuto et al. |
| 5,883,953 A | 3/1999 | Pelegris |
| 5,910,877 A | 6/1999 | Paske et al. |
| 5,923,238 A | 7/1999 | Polzehl et al. |
| 5,936,821 A | 8/1999 | Busse et al. |
| 5,999,412 A | 12/1999 | Busse et al. |
| D429,690 S | 8/2000 | Fristedt |
| 6,266,223 B1 | 7/2001 | Curry |
| 6,302,723 B1 | 10/2001 | Baum et al. |
| 6,341,973 B1 | 1/2002 | Endo |
| 6,445,560 B1 | 9/2002 | Bobert et al. |
| D472,877 S | 4/2003 | Jaag |
| 6,654,223 B1 | 11/2003 | Bippus et al. |
| 7,008,243 B2 | 3/2006 | Mueller et al. |
| D523,819 S | 6/2006 | Christianson et al. |
| 7,147,412 B2 | 12/2006 | Davis |
| D535,618 S | 1/2007 | Hu et al. |
| 7,175,468 B1 | 2/2007 | Chang |
| D591,691 S | 5/2009 | Baker et al. |
| D620,896 S | 8/2010 | Petersen |
| 8,064,182 B2 | 11/2011 | Baker et al. |
| 2004/0246644 A1 | 12/2004 | Sato et al. |
| 2005/0094466 A1 | 5/2005 | Archer et al. |
| 2008/0032566 A1 | 2/2008 | Walter et al. |
| 2008/0204963 A1 | 8/2008 | Baker et al. |

FOREIGN PATENT DOCUMENTS

DE  100 01 553 A1  8/2001

OTHER PUBLICATIONS

U.S. Appl. No. 29/318,746, Petersen, filed May 27, 2008.

* cited by examiner

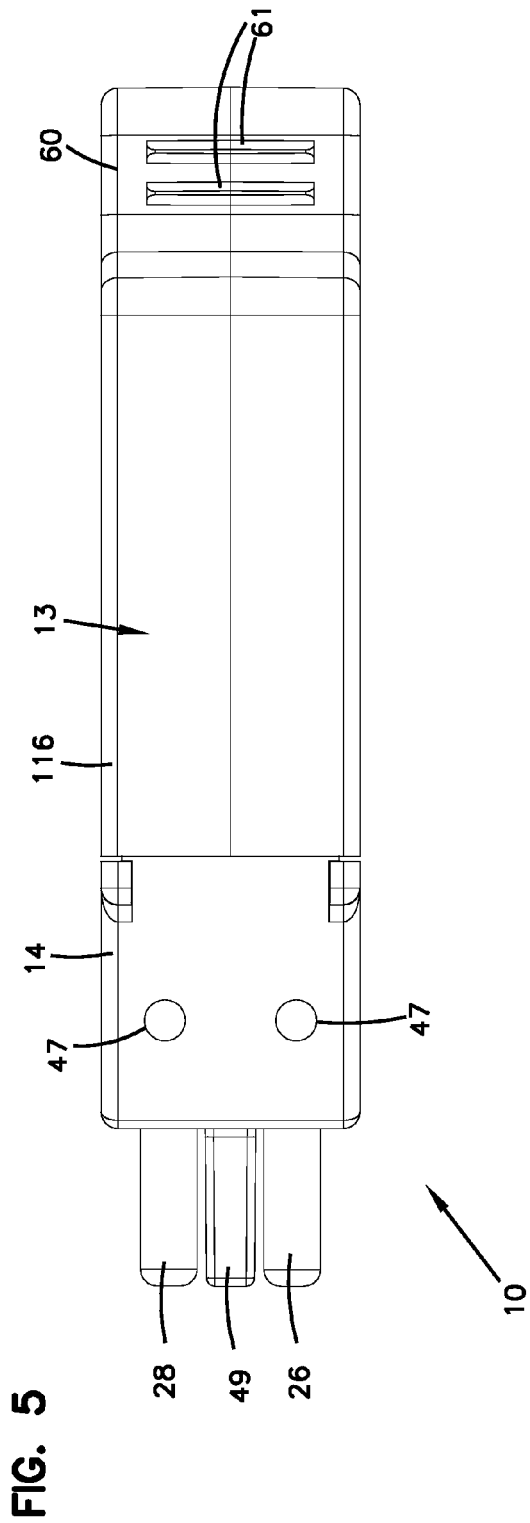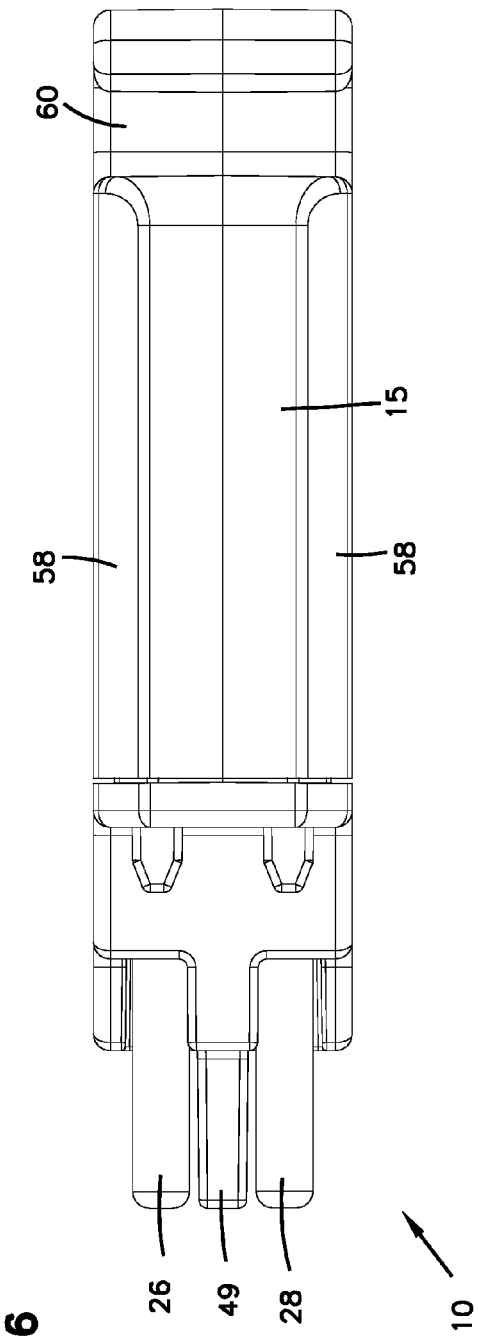

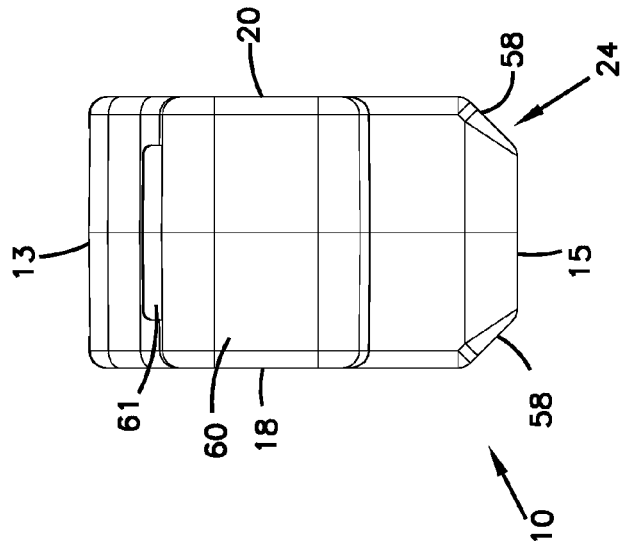
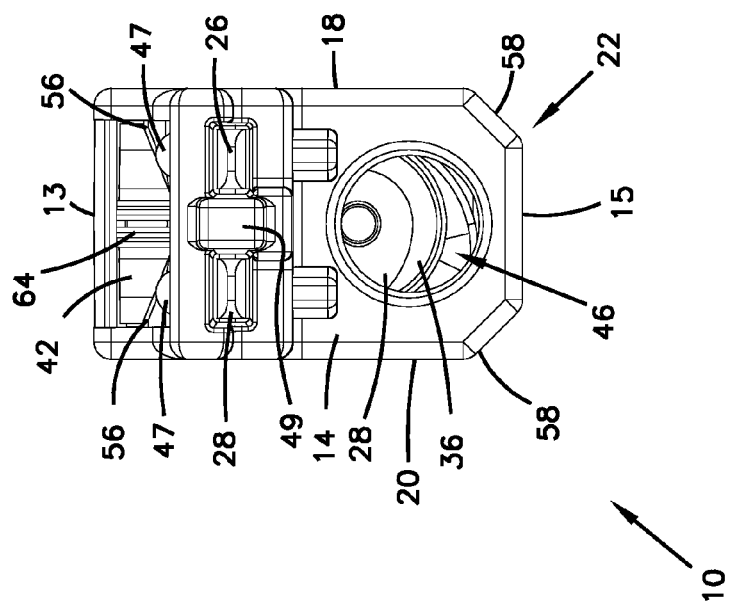

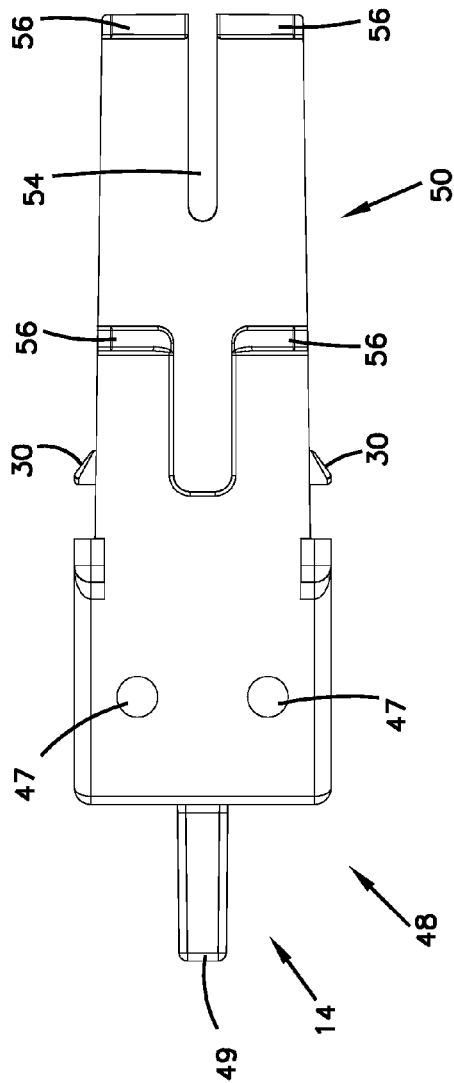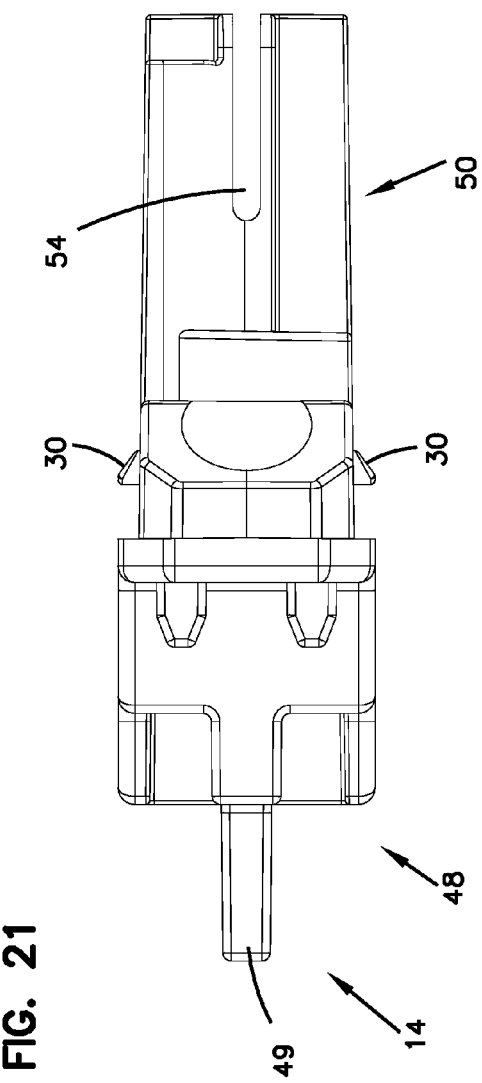

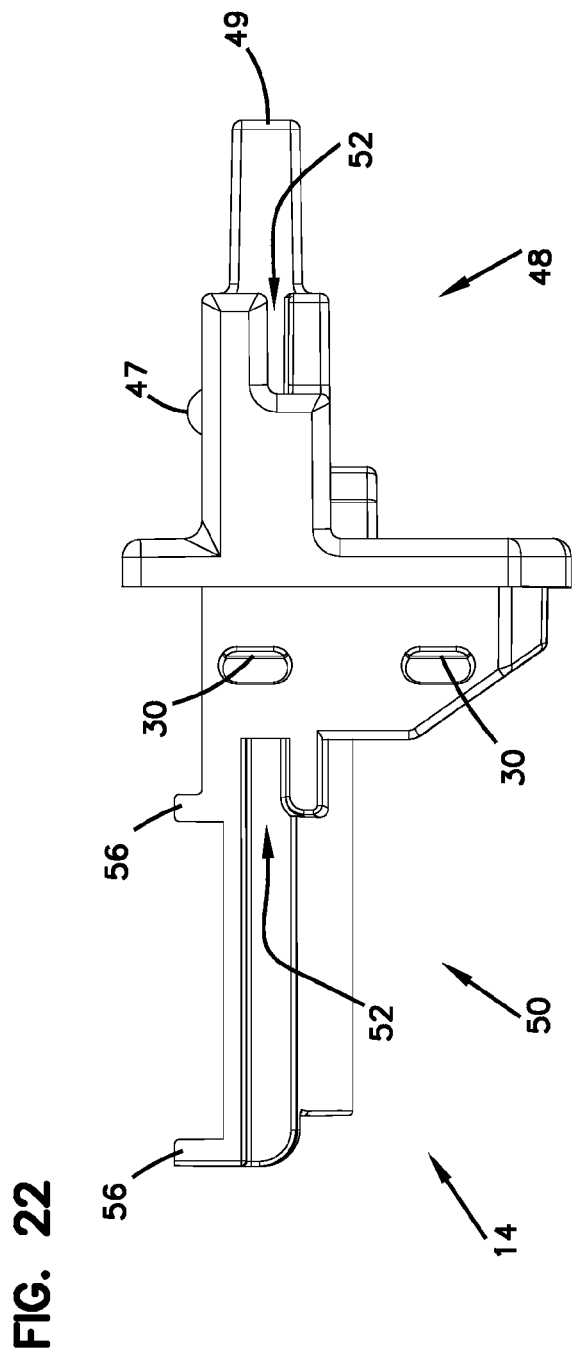

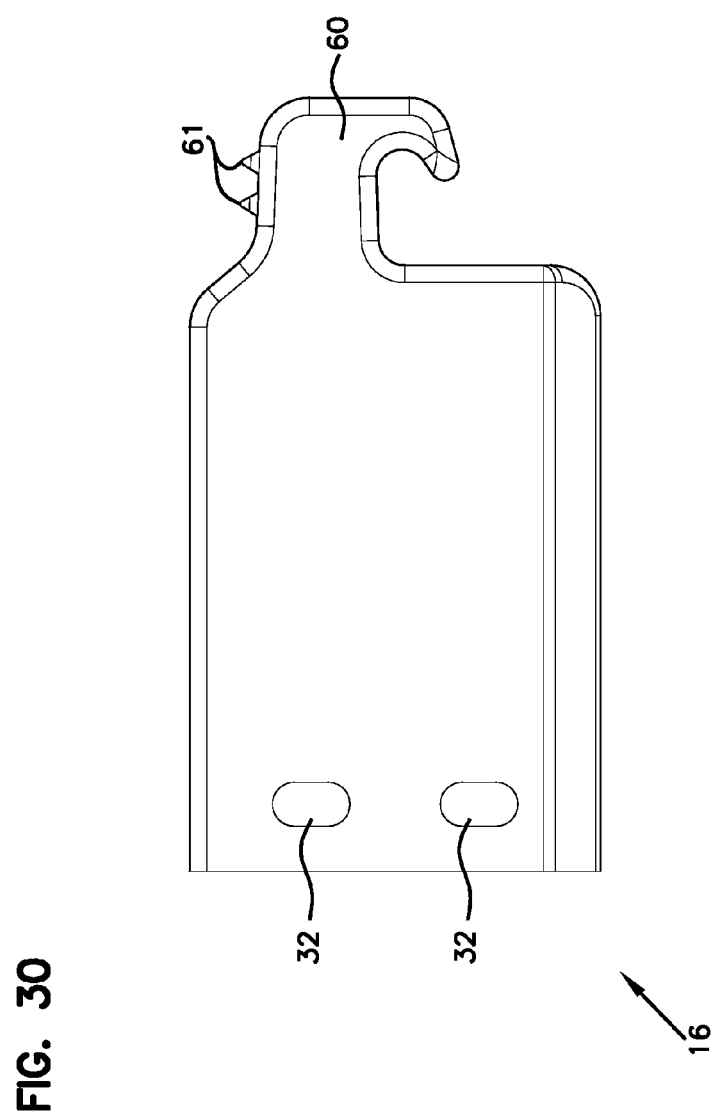

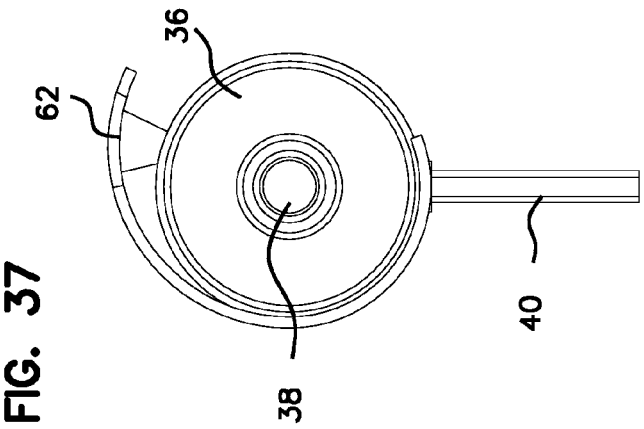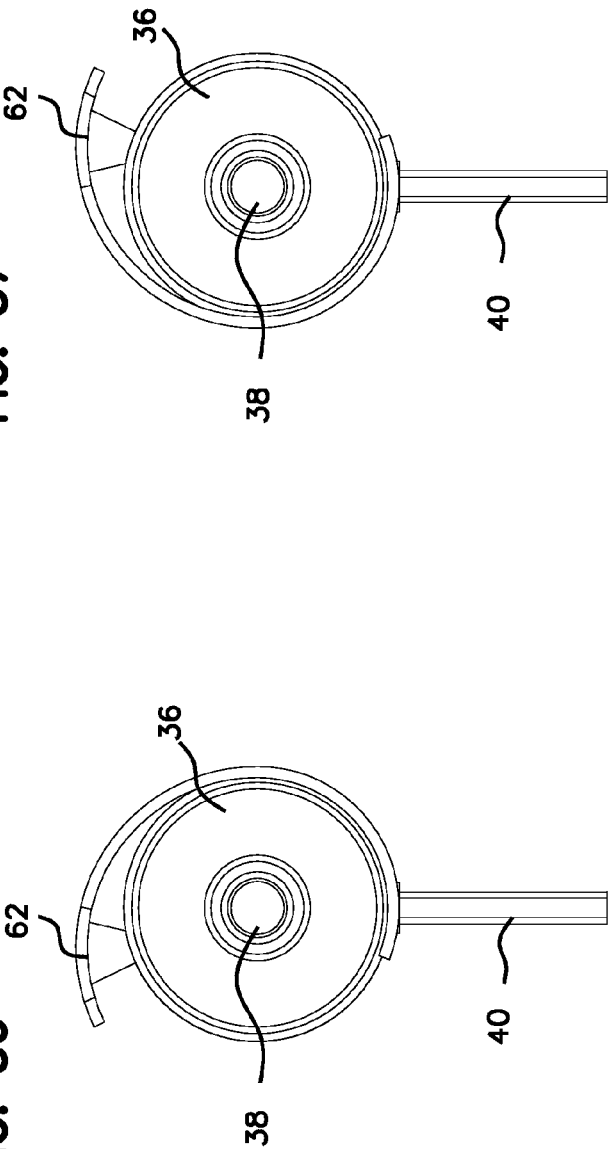

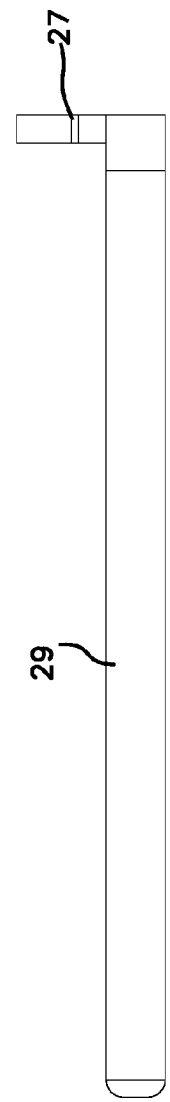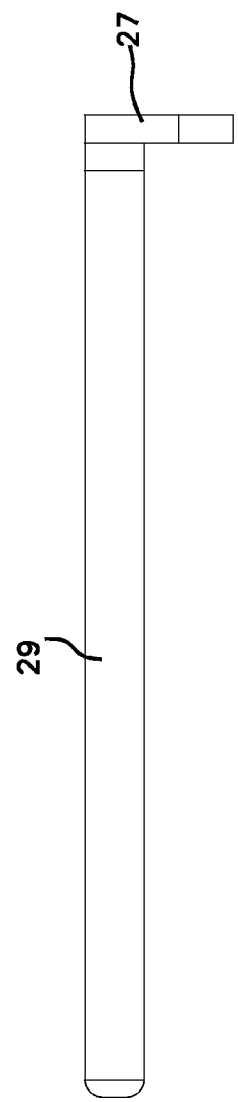

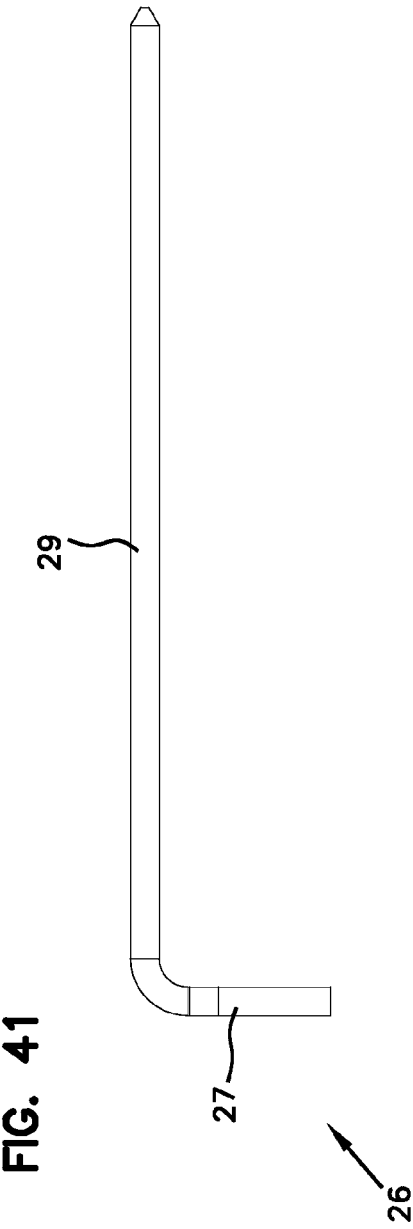
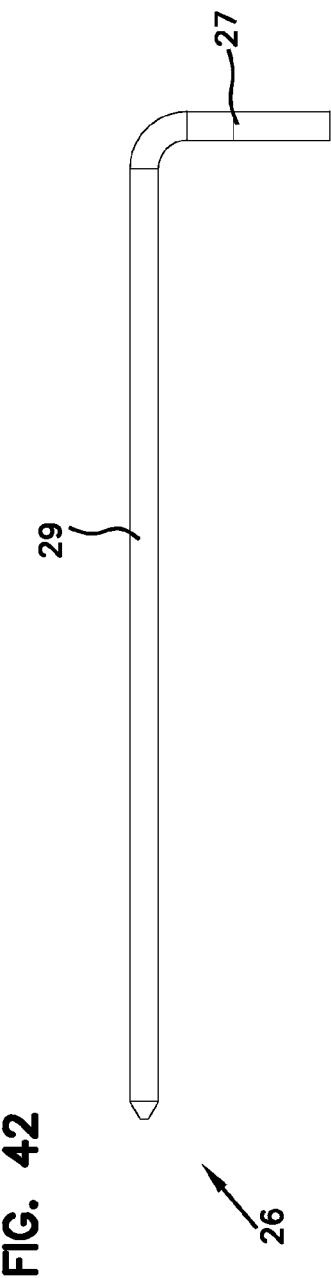
FIG. 41
FIG. 42

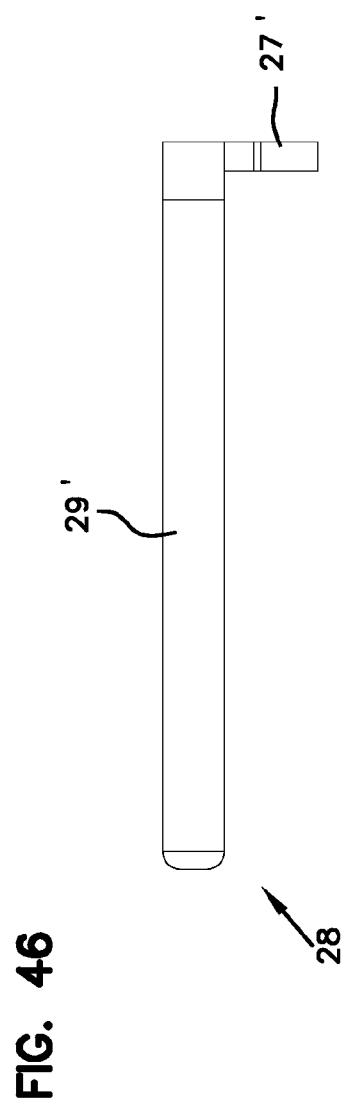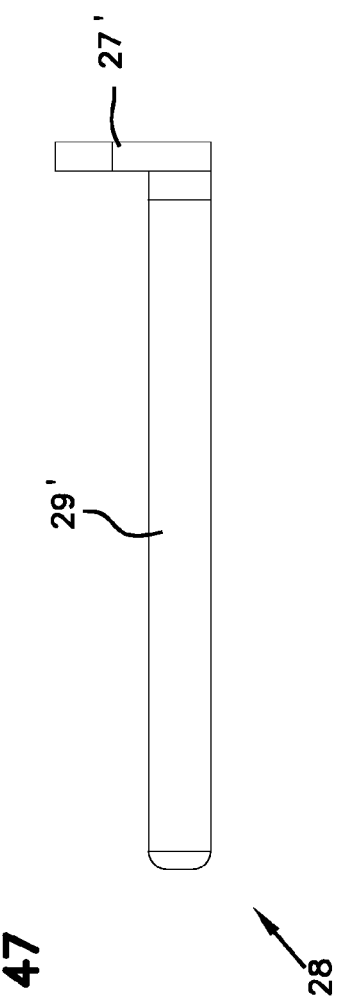

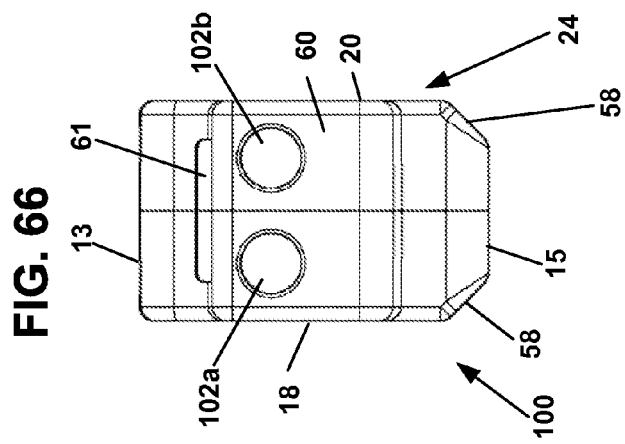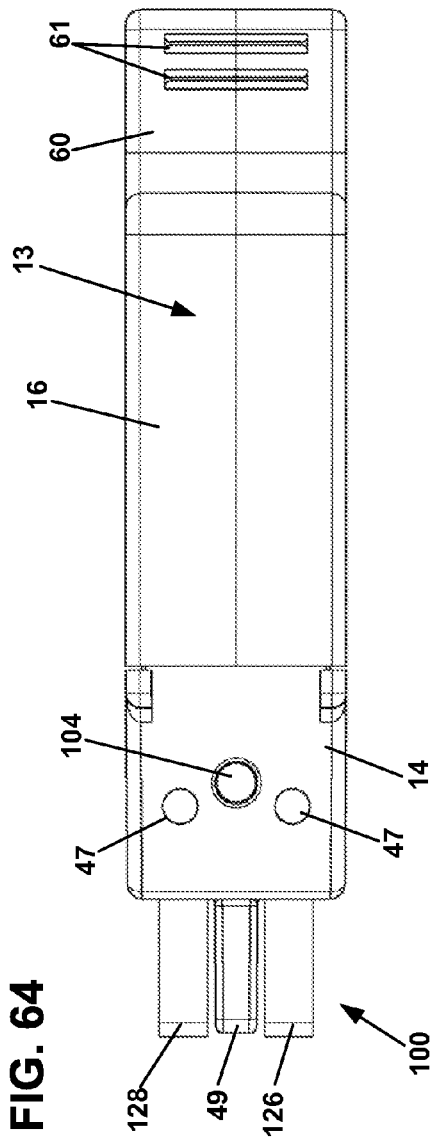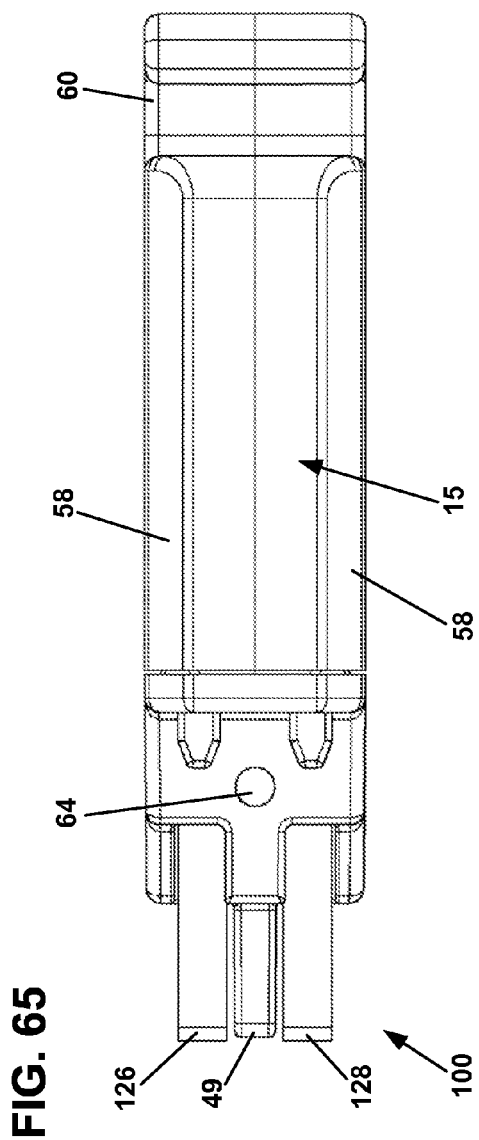

OVERVOLTAGE PROTECTION PLUG

CROSS-REFERENCE TO RELATED APPLICATIONS

The present application claims priority to U.S. Provisional Patent Application No. 61/056,328, filed May 27, 2008, the disclosure of which is hereby incorporated by reference in its entirety.

TECHNICAL FIELD

The present disclosure relates generally to circuit protection in communications system; more particularly, the present disclosure relates to an overvoltage protection plug usable in conjunction with a connection block.

BACKGROUND

Telecommunications systems generally include connection and disconnection systems, through which various types of telecommunications equipment are interconnected. Such systems generally require electrical protection, such as to prevent overvoltage and overcurrent events from damaging equipment, as can occur in the case of lightning strikes, power surges, or other electrical events. Various types of gas tube and solid state overvoltage protection components exist and are used in these telecommunications systems.

One piece of equipment used for connection of telecommunications systems is referred to herein as a connection block, sometimes referred to as a "Krone-style connector block", such as those manufactured by ADC GmbH, formerly Krone GmbH. Such systems include a high density array of electrical connectors in a punch-down configuration, and are designed to accept overvoltage and overcurrent protection devices to protect the telecommunications equipment connected to the output side of the telecommunications circuit connected via the block. Because of the large number of wires being connected in a small area in a connection block, a small form factor circuit protection element is dictated. Other design requirements and failsafe protections may also limit the applicability of various gas tube and solid state protection devices. For example, gas tube overvoltage protection systems are disadvantaged in that, for higher voltage applications, the gas tube required increases in size. Additionally, cost reduction considerations require minimization of the number of components used.

SUMMARY

The present disclosure relates generally to an overvoltage protection plug used in conjunction with a connection block. The overvoltage protection plug utilizes a gas tube rated sufficiently to meet various voltage safety certification requirements, and is configured to fit into a connection block while avoiding physical interference with neighboring circuit protection elements or connection locations.

According to a first aspect, an overvoltage protection plug is disclosed. The overvoltage protection plug includes a protection plug body formed from a chassis and a housing and defining an interior volume, the protection plug body including an insertion portion and a handle. The overvoltage protection plug further includes a gas tube located within the interior volume, the gas tube electrically connected to metallic leads protruding through the body at the insertion portion. The overvoltage protection plug also includes a grounding plate electrically connected to a ground pin of the gas tube.

According to a second aspect, a method of assembling an overvoltage protection plug is disclosed. The method includes mounting a gas tube to a chassis, and electrically connecting the gas tube to metallic leads, the metallic leads extending through the chassis. The method further includes inserting at least a portion of the chassis into a housing to form a body for the overvoltage protection plug, the body including an interior volume, and wherein the gas tube resides within the interior volume and the metallic leads extending through the chassis and are exposed external to the body. In certain cases, the method further includes filling the interior volume with gel, thereby environmentally protecting the interior volume of the overvoltage protection plug.

According to a third aspect, an overvoltage protection plug is disclosed. In this aspect, the overvoltage protection plug includes a protection plug body formed from a chassis and a housing and defining an interior volume, the protection plug body including an insertion portion and a handle. The overvoltage protection plug also includes a gas tube located within the interior volume and a plurality of metallic leads electrically connected to the gas tube, the plurality of metallic leads extending through slots in the chassis for electrical connection to a connection block. The overvoltage protection plug includes a grounding plate electrically connected to a grounding pin of the gas tube, and a gel surrounding the gas tube within the interior volume and arranged to protect the gas tube from environmental conditions surrounding the overvoltage protection plug.

According to a further aspect, an overvoltage protection plug is disclosed. The overvoltage protection plug includes a protection plug body formed from a chassis and a housing and defining an interior volume, the protection plug body including an insertion portion and a handle. The overvoltage protection plug also includes a gas tube located within the interior volume, the gas tube including electrically connected to conductive contacts within the interior volume, the conductive contacts protruding through the body at the insertion portion. The protection plug body includes a gel access opening for providing access to the interior volume.

According to a still further aspect, an overvoltage protection plug is disclosed. The overvoltage protection plug includes a chassis including an insertion portion arranged to be received into a connection block. The chassis includes a plurality of slots arranged to receive conductive leads, the slots extending through the chassis and oriented toward the insertion portion. The chassis further includes a grounding pin slot arranged to receive a grounding pin of a gas tube, and a guide member located between the slots and extending from the insertion portion. The chassis also includes a plurality of tabs defining a grounding plate mounting location on a top side of the chassis and a gel access opening extending through the chassis.

According to another aspect, a method of assembling an overvoltage protection plug is disclosed. The method includes electrically connecting each of a plurality of signal posts of a gas tube to conductive leads, the gas tube also including a grounding pin. The method further includes sliding the conductive leads through slots in the chassis and electrically connecting a grounding plate to the grounding pin on a side of the chassis opposite the gas tube. The method also includes inserting at least a portion of the chassis into a housing to form a snap-fit connection, the chassis and housing forming a body for the overvoltage protection plug. The method includes filling an interior volume of the overvoltage protection plug with gel through a gel access opening in the chassis, wherein the gel is arranged to protect the gas tube from environmental conditions.

BRIEF DESCRIPTION OF THE DRAWINGS

FIG. 5 is a top plan view of the overvoltage protection plug of FIG. 1;

FIG. 6 is a bottom plan view of the overvoltage protection plug of FIG. 1;

FIG. 7 is an insertion side plan view of the overvoltage protection plug of FIG. 1;

FIG. 8 is a handle-side plan view of the overvoltage protection plug of FIG. 1;

FIG. 20 is a top plan view of the chassis of FIG. 19;

FIG. 21 is a bottom plan view of the chassis of FIG. 19;

FIG. 22 is a left side plan view of the chassis of FIG. 19;

FIG. 30 is a right side plan view of the housing of FIG. 26;

FIG. 36 is a further side plan view of the gas tube of FIG. 33, perpendicular to the view of FIG. 35;

FIG. 37 is a side plan view of the gas tube of FIG. 33, opposite the side shown in FIG. 35;

FIG. 39 is a top side plan view of the electrical contact of FIG. 38;

FIG. 40 is a bottom side plan view of the electrical contact of FIG. 38;

FIG. 41 is a left side plan view of the electrical contact of FIG. 38;

FIG. 42 is a right side plan view of the electrical contact of FIG. 38;

FIG. 46 is a top side plan view of the electrical contact of FIG. 45;

FIG. 47 is a bottom side plan view of the electrical contact of FIG. 45;

FIG. 64 is a top plan view of the overvoltage protection plug of FIG. 59;

FIG. 65 is a bottom plan view of the overvoltage protection plug of FIG. 59;

FIG. 66 is a handle-side plan view of the overvoltage protection plug of FIG. 59;

DETAILED DESCRIPTION

Figure 1:
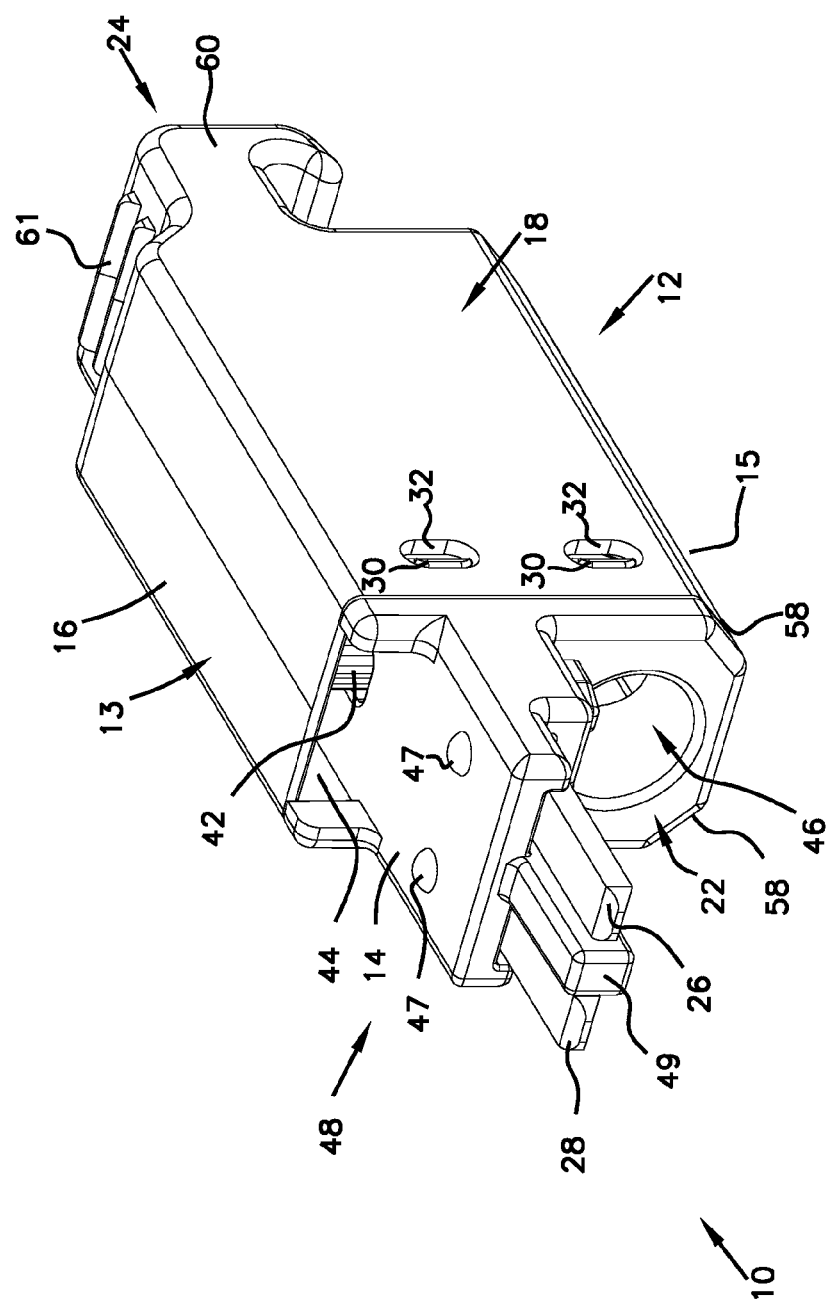
FIG. 1 is a right side perspective view of an overvoltage protection plug, in accordance with a possible embodiment of the present disclosure.
Figure 2:
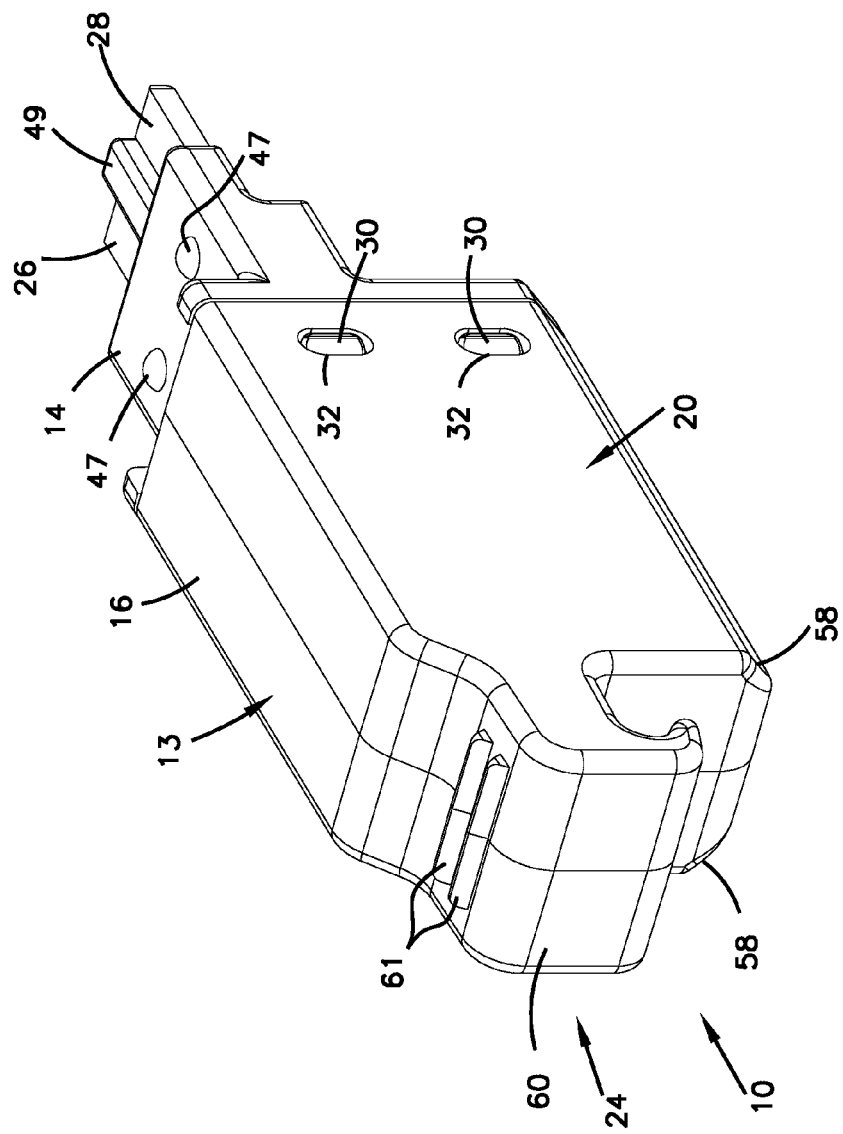
FIG. 2 is a left side perspective view of the overvoltage protection plug of FIG. 1.
Figure 3:
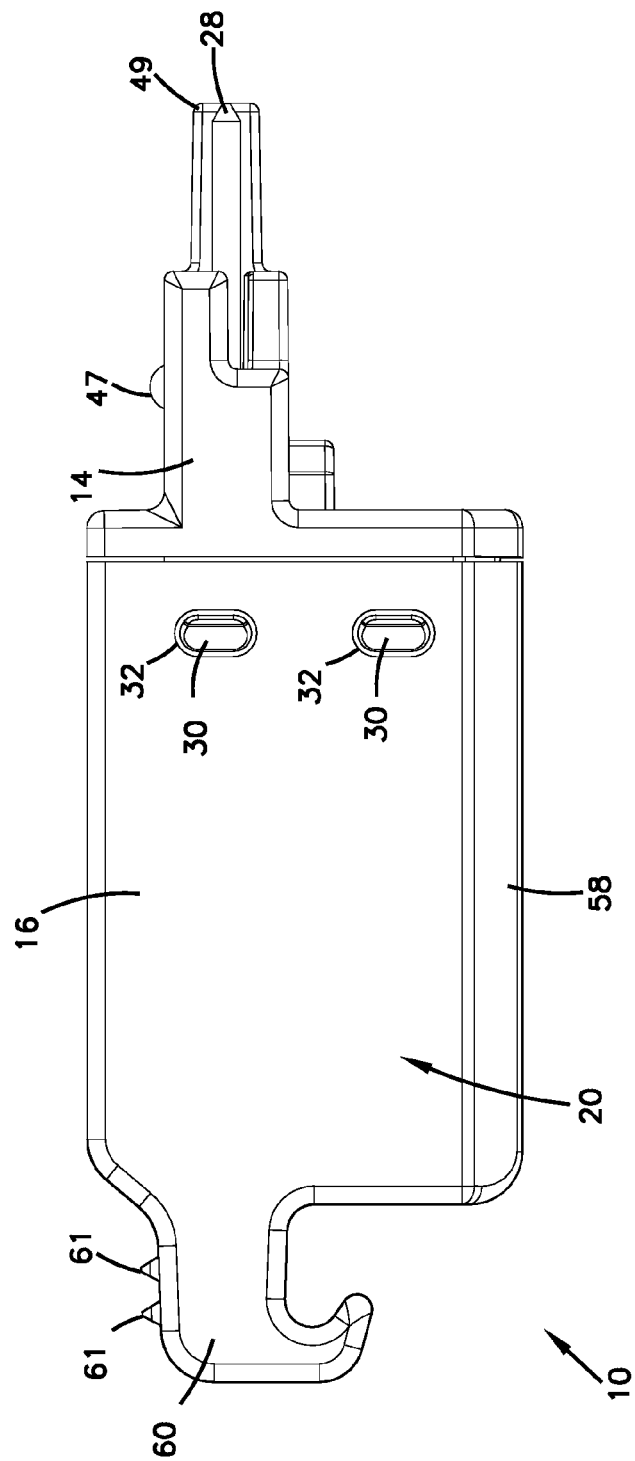
FIG. 3 is a left side plan view of the overvoltage protection plug of FIG. 1.
Figure 4:
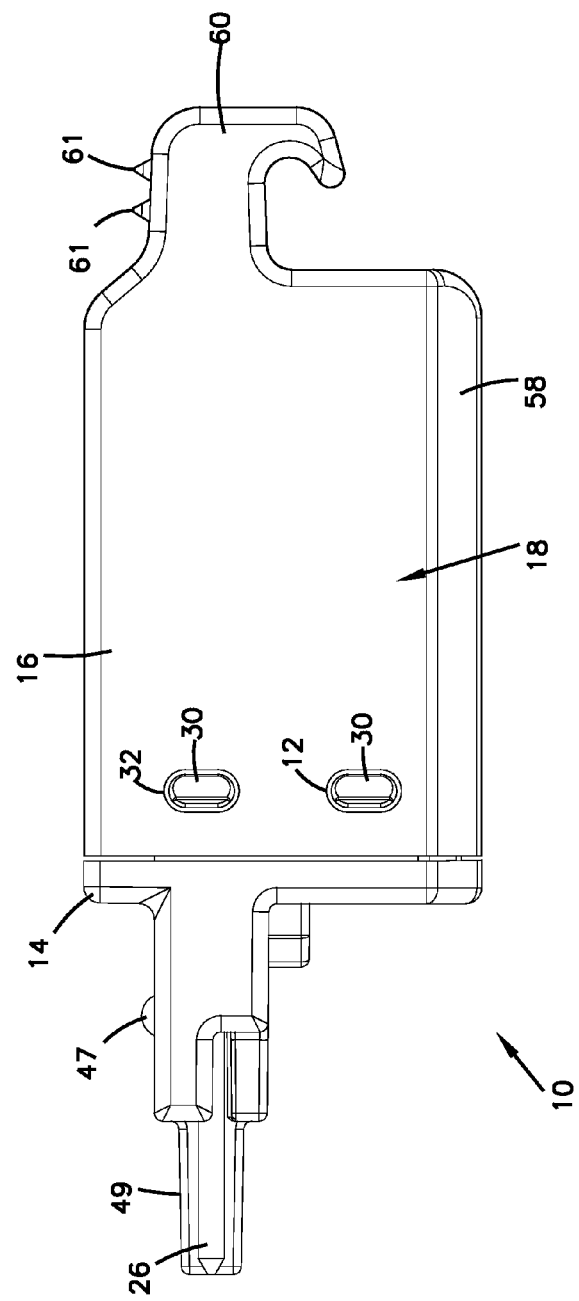
FIG. 4 is a right side plan view of the overvoltage protection plug of FIG. 1.
Figure 9:
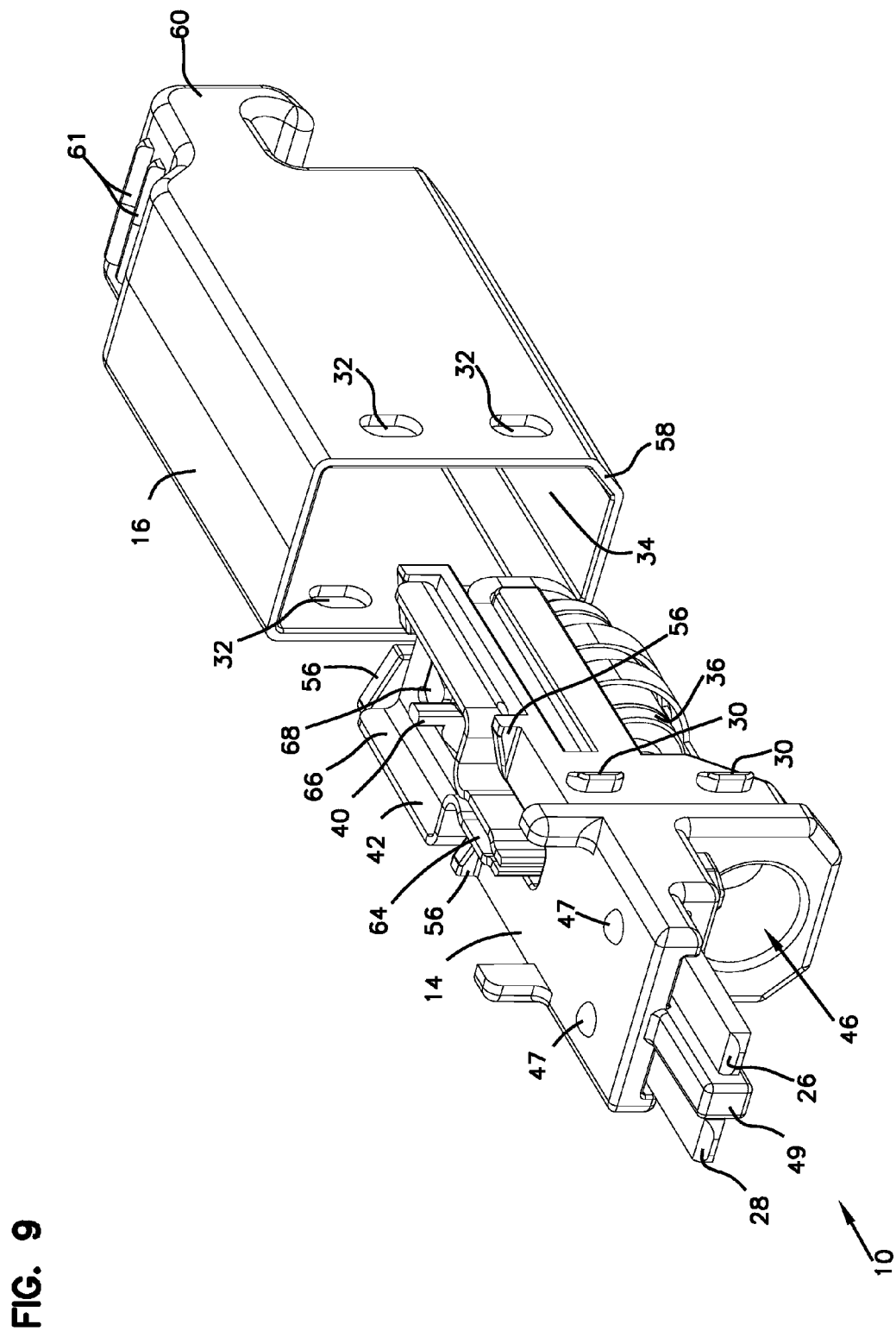
FIG. 9 is a right side partially exploded view of the overvoltage protection plug of FIG. 1, illustrating insertion of a chassis into a housing.
Figure 10:
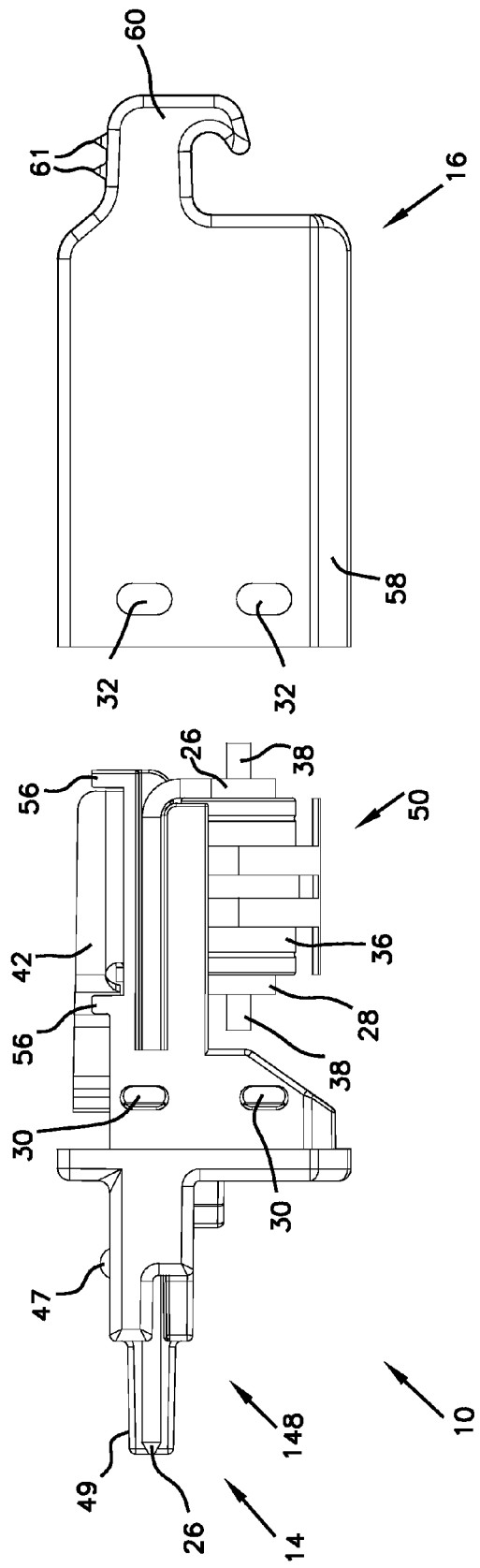
FIG. 10 is a right side plan view of the overvoltage protection plug of FIG. 9.
Figure 11:
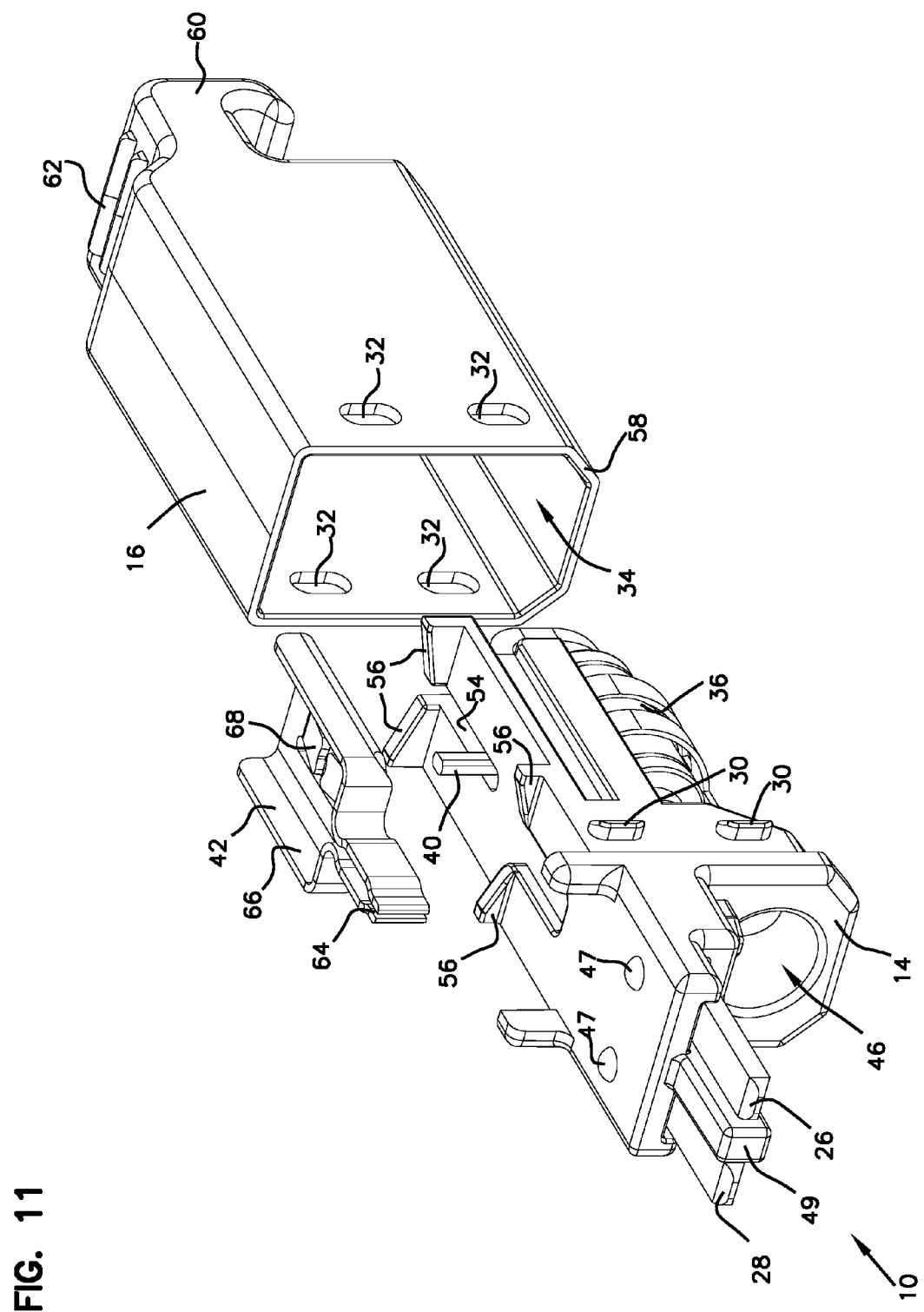
FIG. 11 is a right side partially exploded view of the overvoltage protection plug of FIG. 1, illustrating connection of a grounding plate within the plug.
Figure 12:
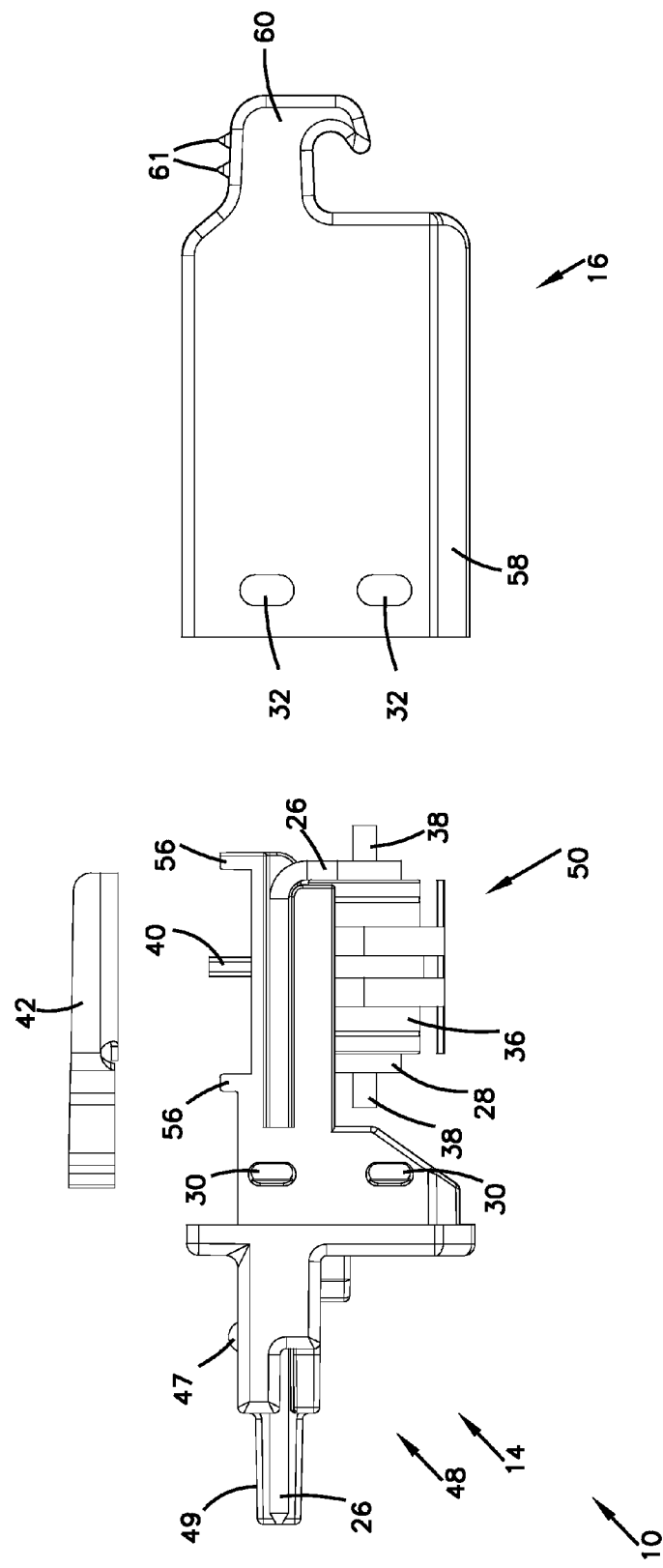
FIG. 12 is a right side plan view of the overvoltage protection plug of FIG. 11.
Figure 13:
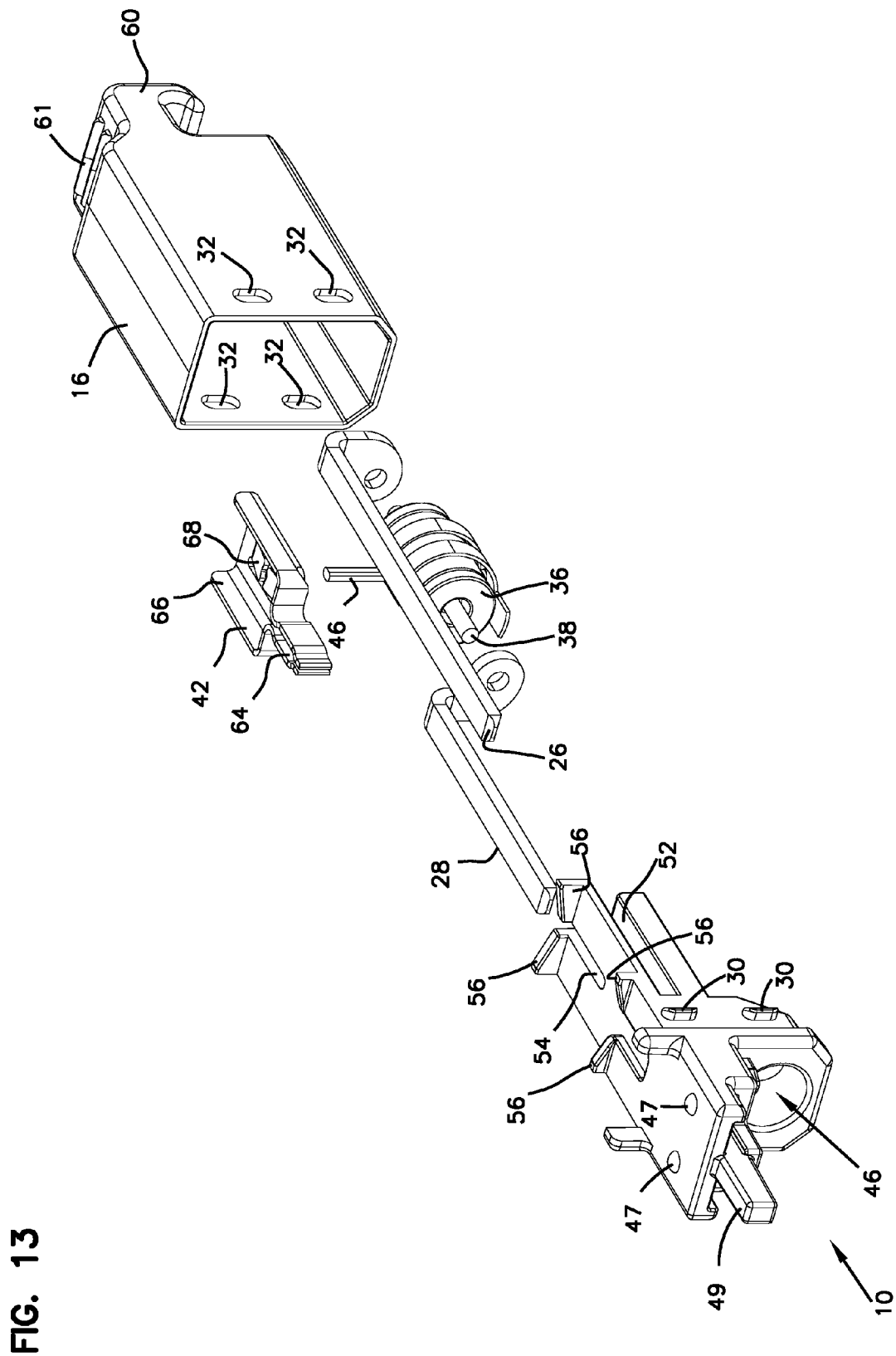
FIG. 13 is a right side perspective exploded view of the overvoltage protection plug of FIG. 1.
Figure 14:
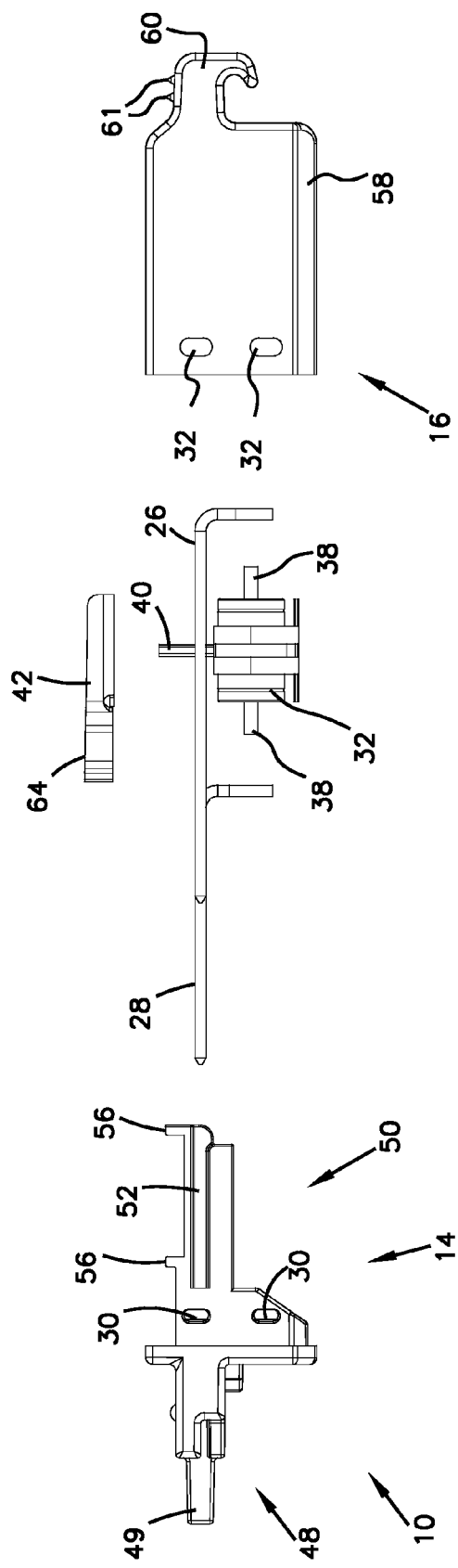
FIG. 14 is a right side plan exploded view of the overvoltage protection plug of FIG. 13.
Figure 15:
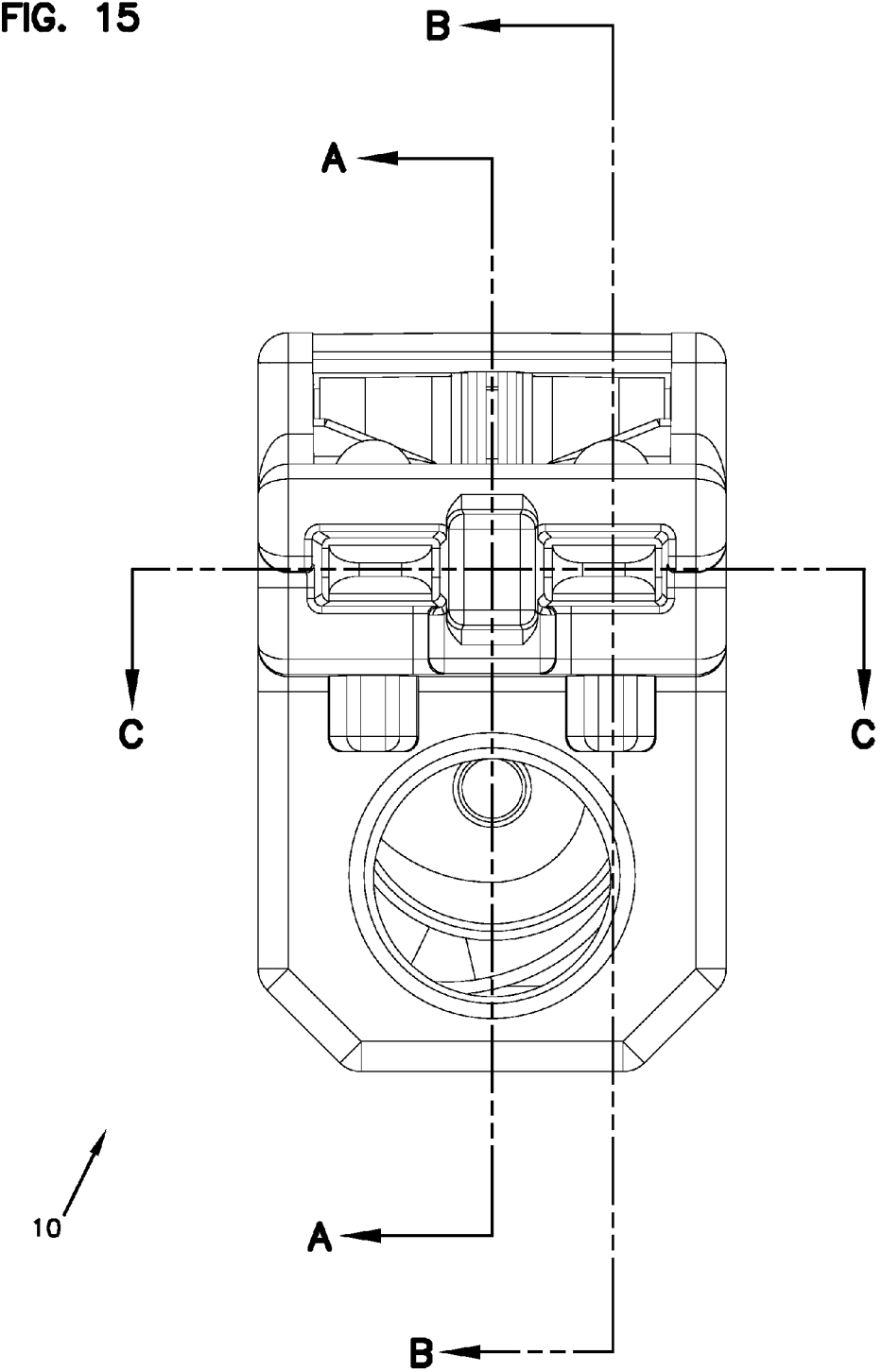
FIG. 15 is an insertion side plan view of the overvoltage protection plug illustrating cross-sectional axes for FIGS. 16-18.
Figure 16:
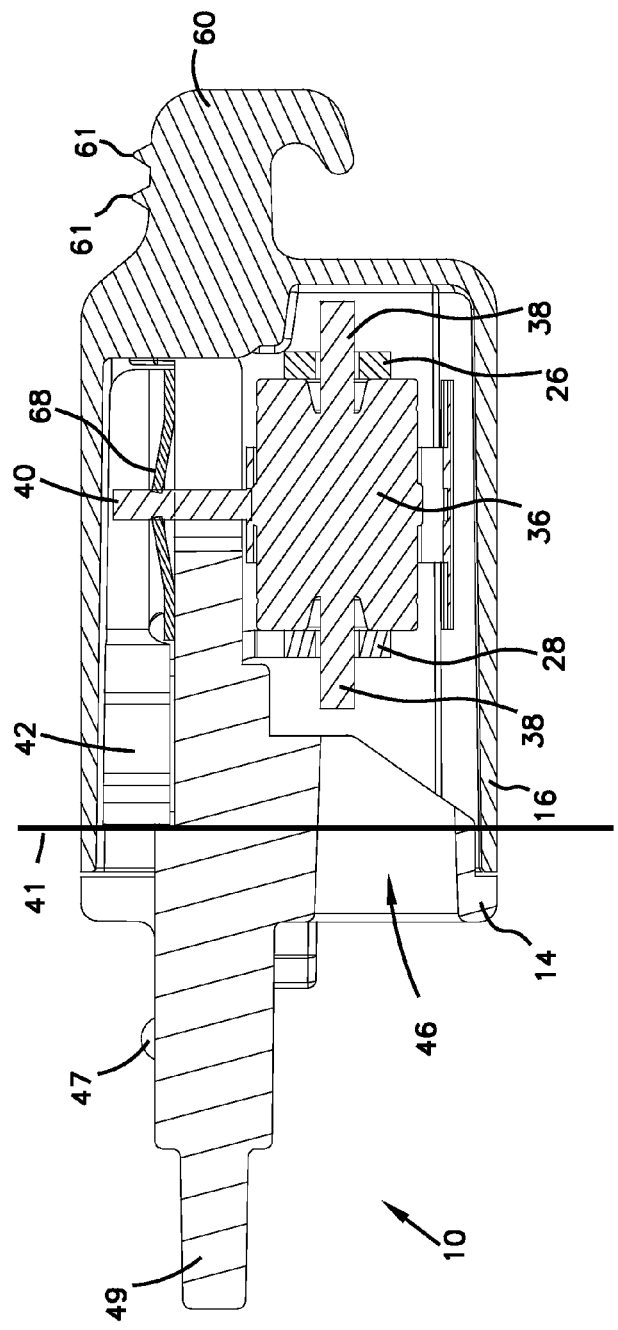
FIG. 16 is a cross-sectional view of the overvoltage protection plug of FIG. 15 along axis A.
Figure 17:
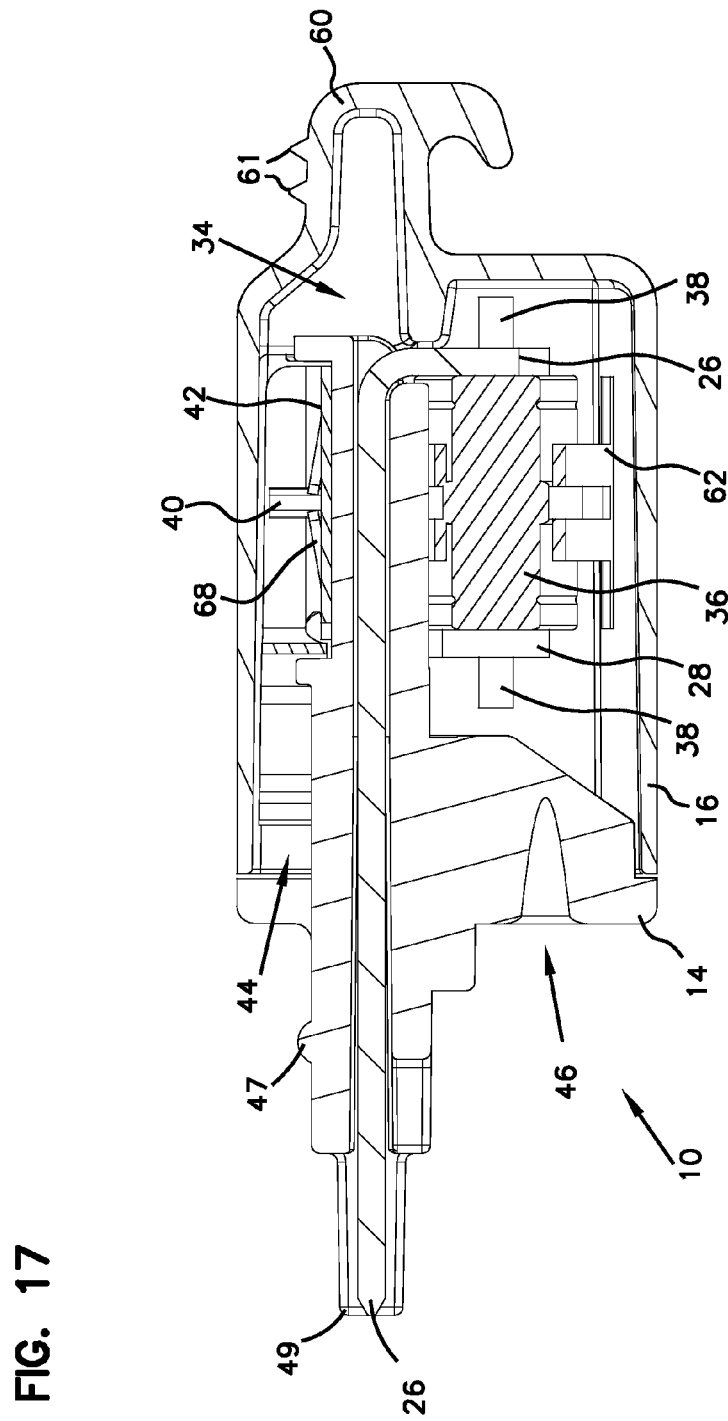
FIG. 17 is a cross-sectional view of the overvoltage protection plug of FIG. 15 along axis B.
Figure 18:
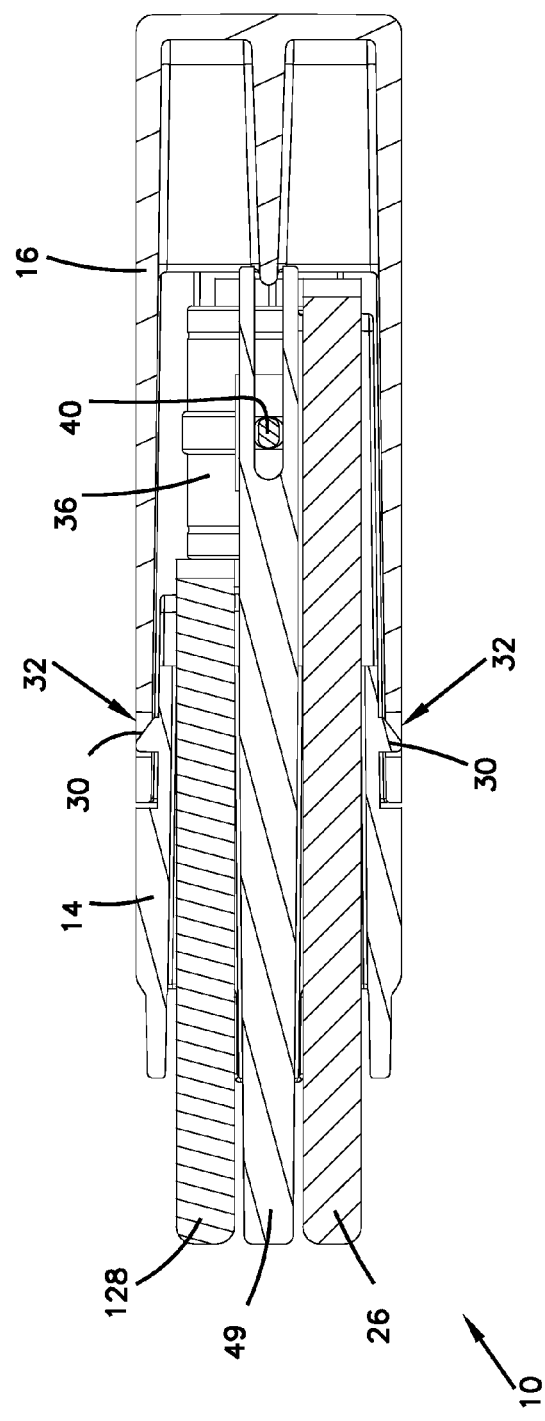
FIG. 18 is a cross-sectional view of the overvoltage protection plug of FIG. 15 along axis C.
Figure 19:
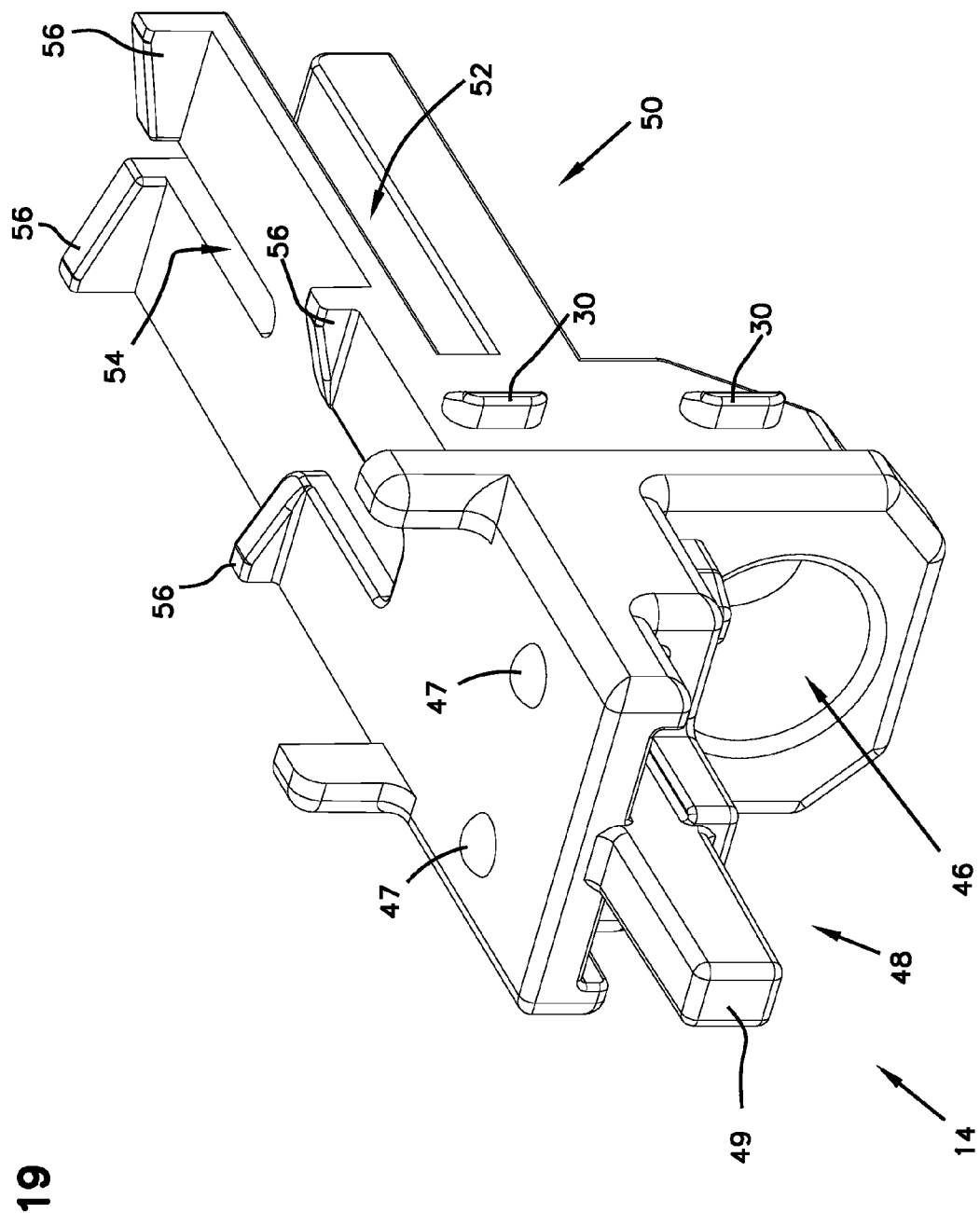
FIG. 19 is a right side perspective view of a chassis useable in the overvoltage protection plug of FIG. 1.
Figure 23:
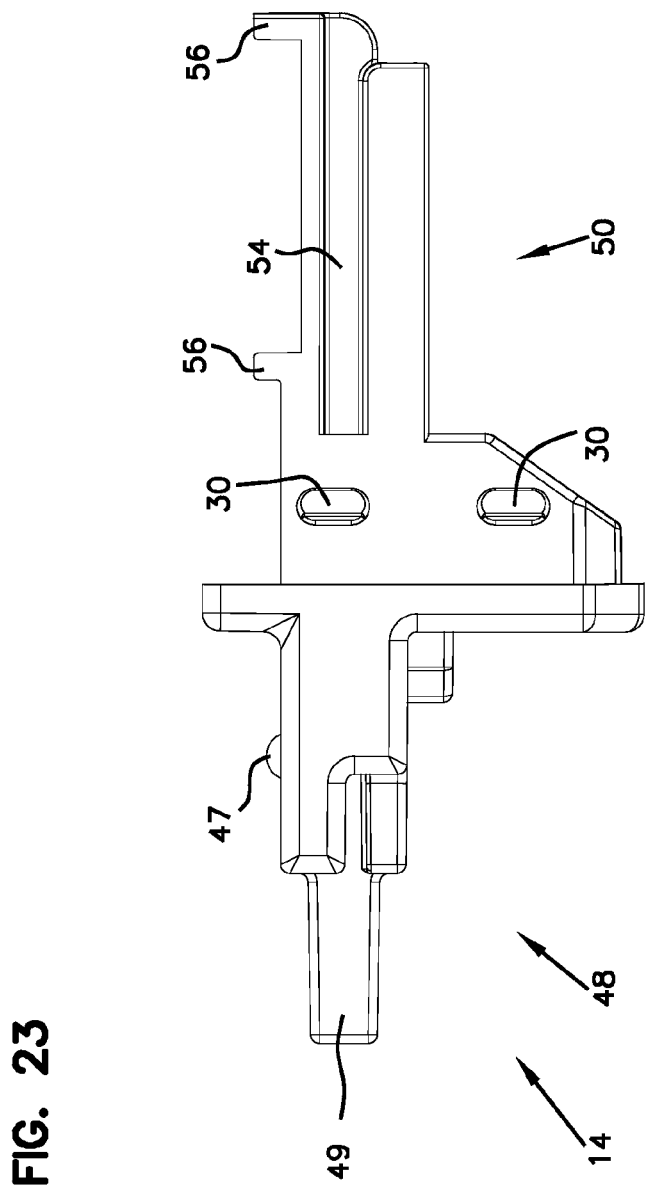
FIG. 23 is a right side plan view of the chassis of FIG. 19.
Figure 24:
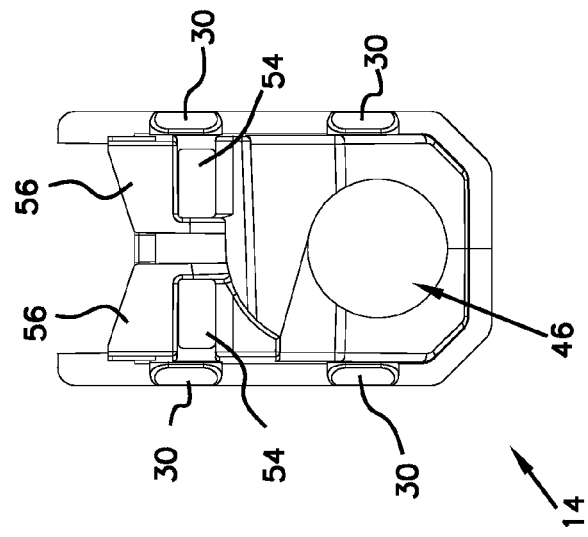
FIG. 24 is an insertion side plan view of the chassis of FIG. 19.
Figure 25:
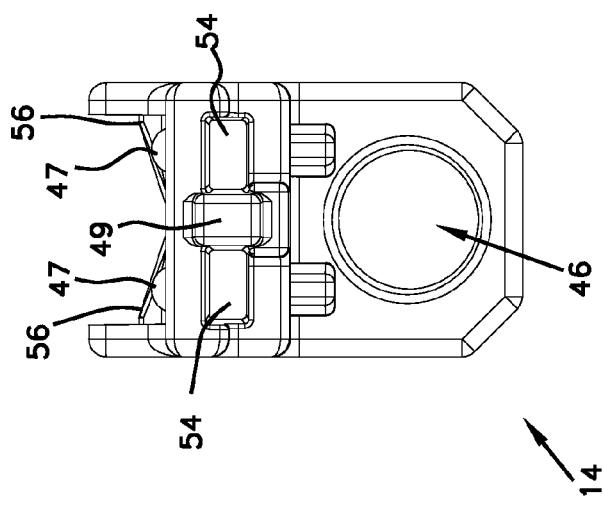
FIG. 25 is an internal side plan view of the chassis of FIG. 19.
Figure 26:
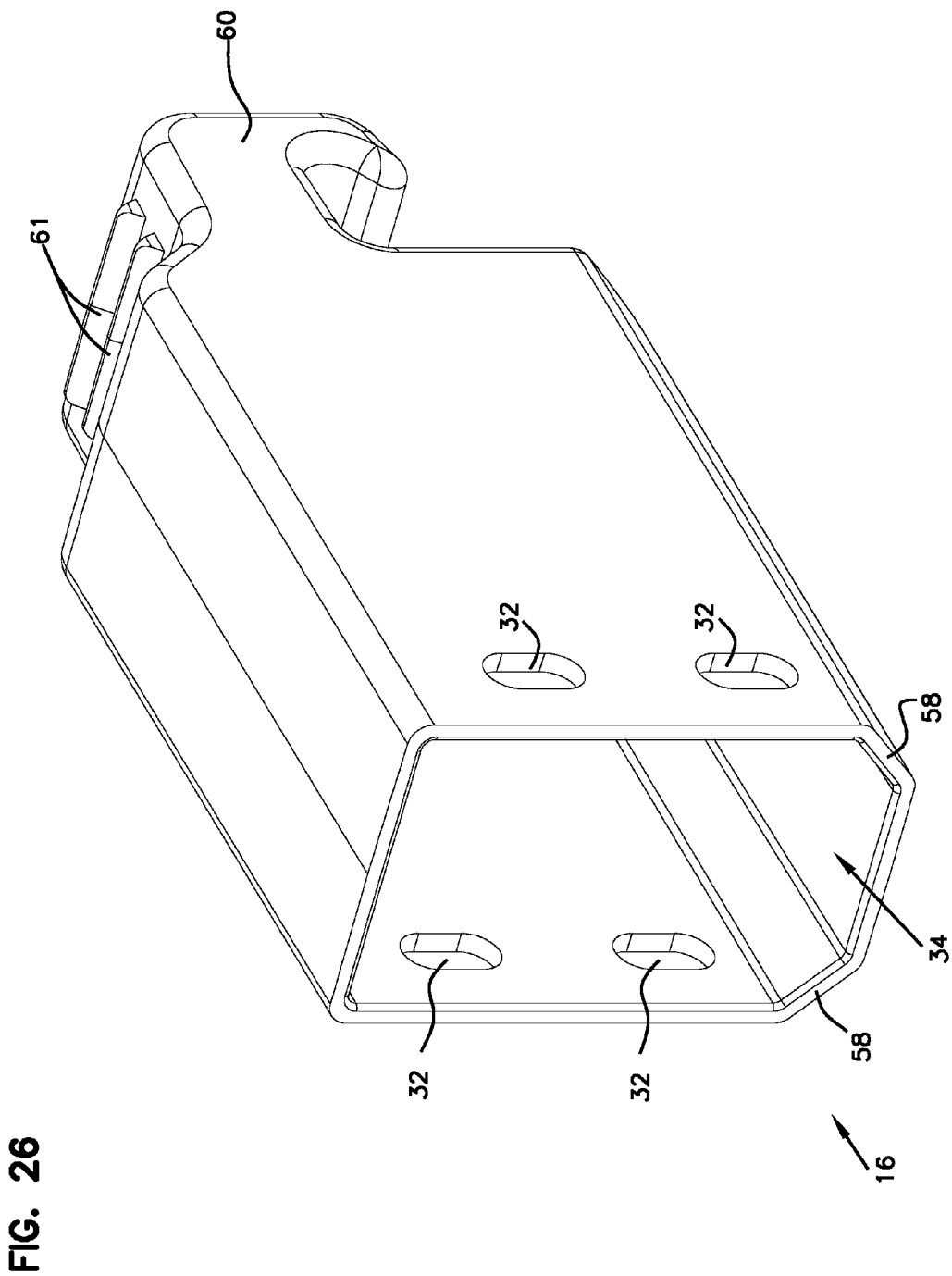
FIG. 26 is a right side perspective view of a housing useable in the overvoltage protection plug of FIG. 1.
Figure 27:
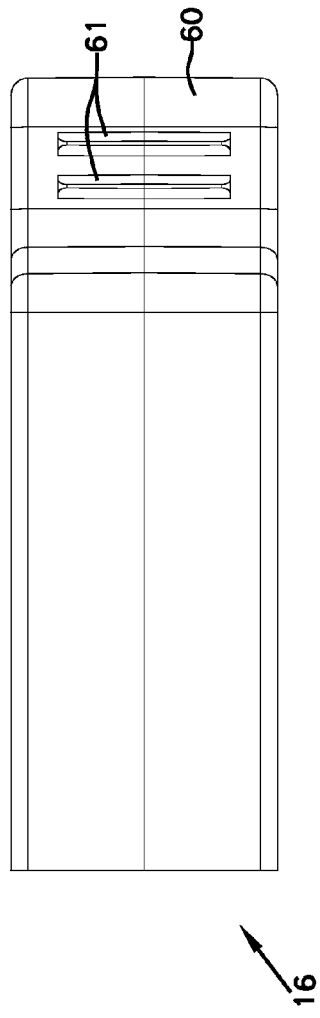
FIG. 27 is a top plan view of the housing of FIG. 26.
Figure 28:
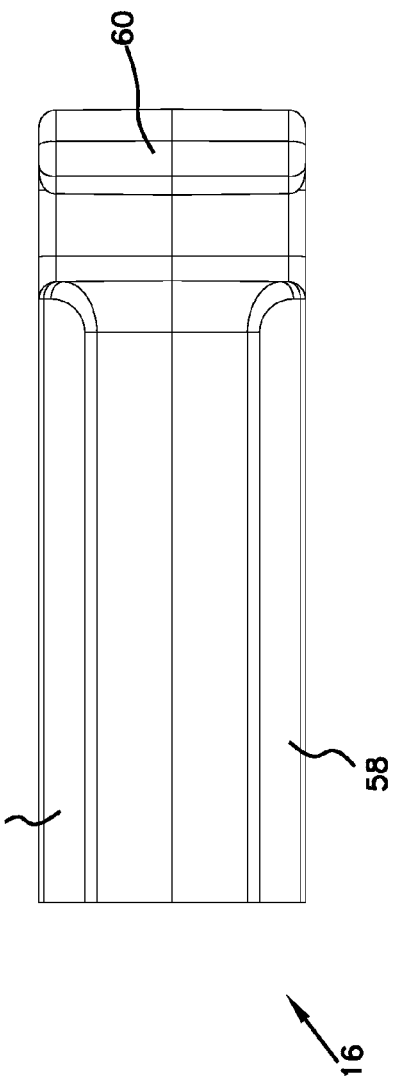
FIG. 28 is a bottom plan view of the housing of FIG. 26.
Figure 29:
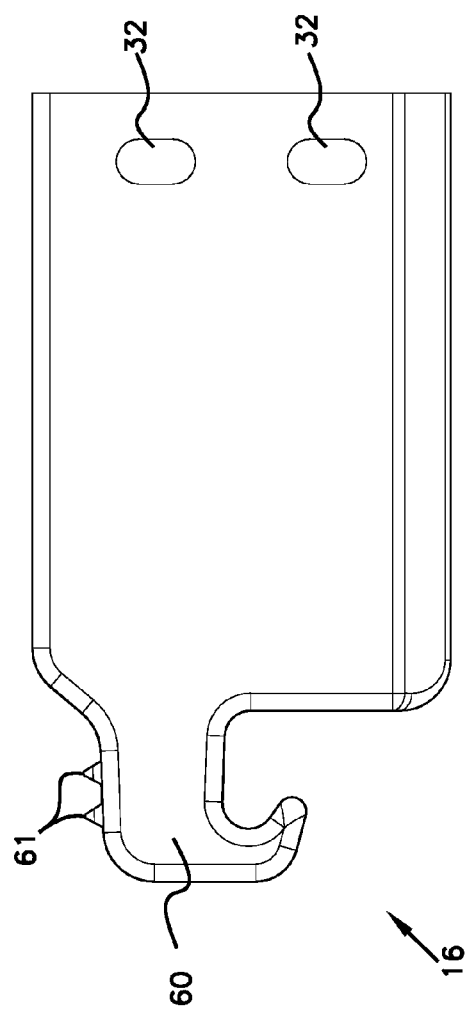
FIG. 29 is a left side plan view of the housing of FIG. 26.
Figure 32:
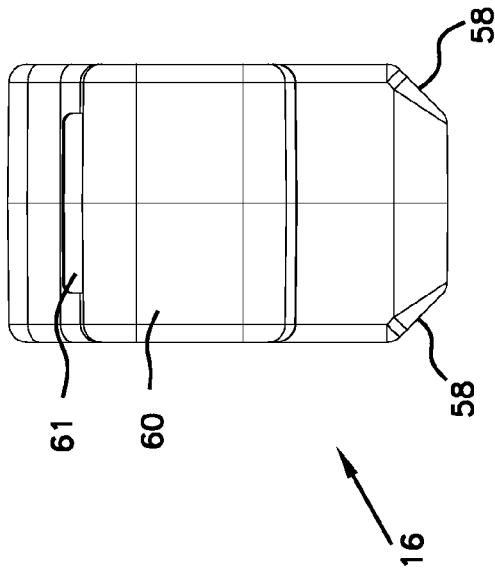
FIG. 32 is a handle side plan view of the housing of FIG. 26.
Figure 31:
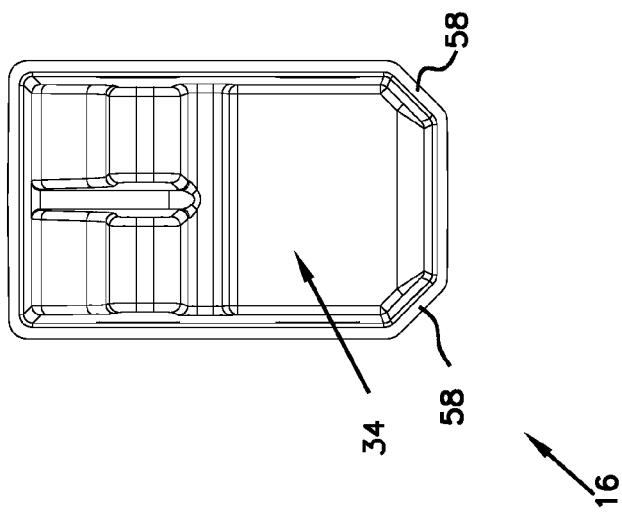
FIG. 31 is an insertion side plan view of the housing of FIG. 26.
Figure 33:
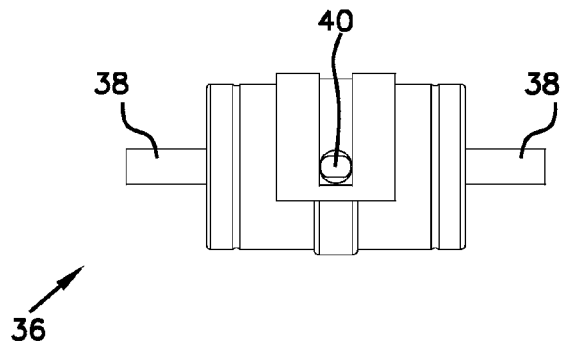
FIG. 33 is a top plan view of a gas tube useable as an overvoltage protection device in the overvoltage protection plug of FIG. 1.
Figure 34:
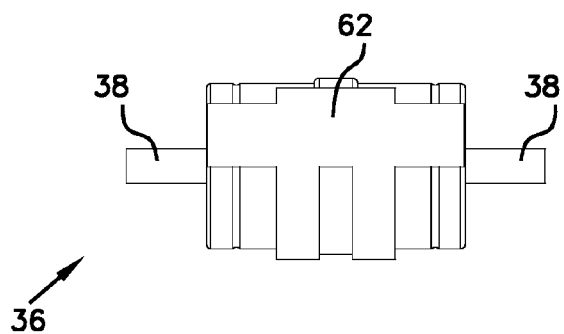
FIG. 34 is a bottom plan view of the gas tube of FIG. 33.
Figure 35:
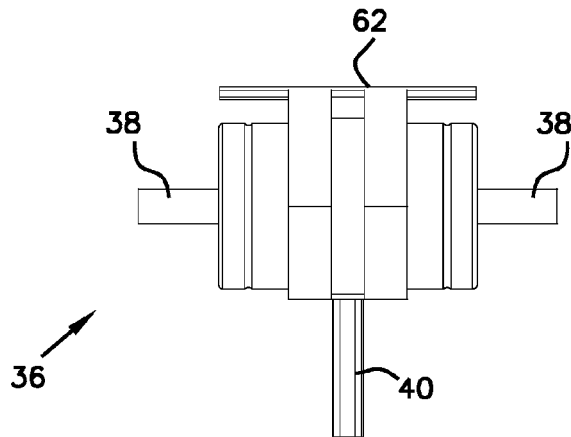
FIG. 35 is side plan view of the gas tube of FIG. 33.
Figure 38:
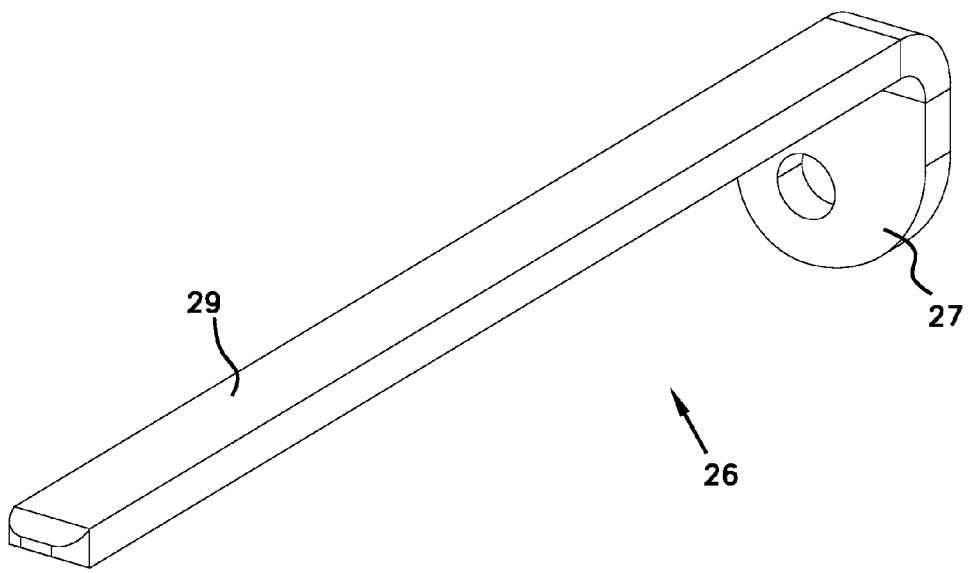
FIG. 38 is a perspective view of an electrical contact useable in the overvoltage protection plug of FIG. 1.
Figure 45:
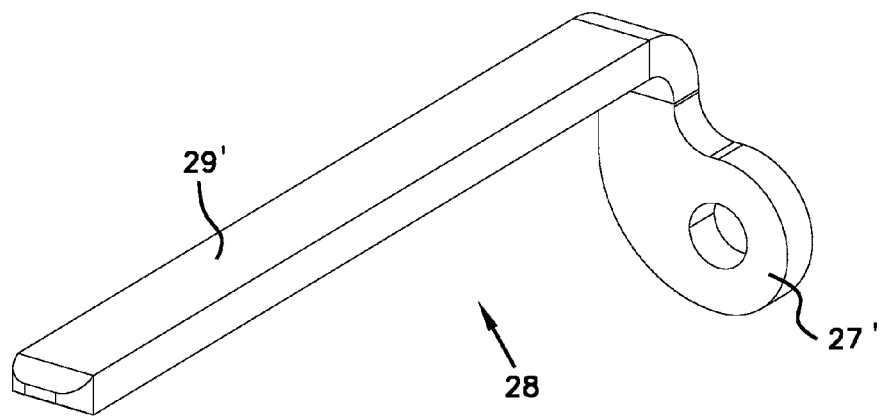
FIG. 45 is a perspective view of a second electrical contact useable in the overvoltage protection plug of FIG. 1.
Figure 43:
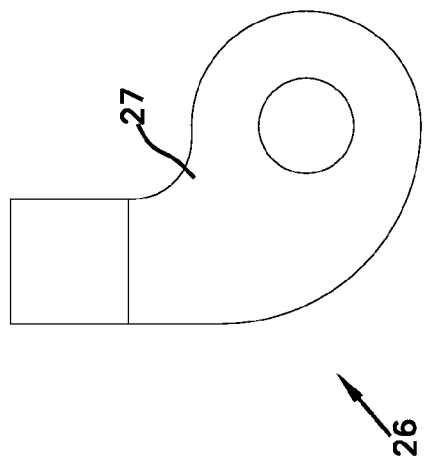
FIG. 43 is an insertion side plan view of the electrical contact of FIG. 38.
Figure 44:
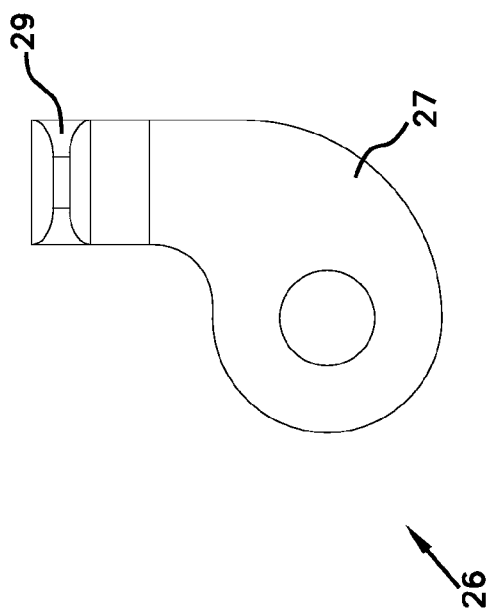
FIG. 44 is a side plan view of the electrical contact of FIG. 38, opposite the insertion side.
Figure 48:
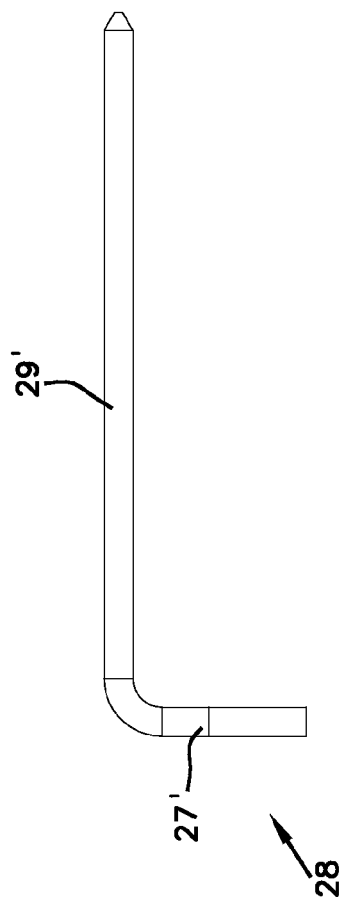
FIG. 48 is a left side plan view of the electrical contact of FIG. 45.
Figure 49:
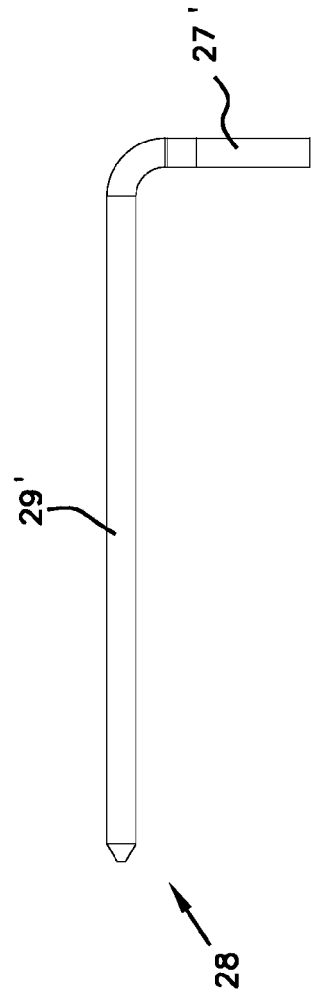
FIG. 49 is a right side plan view of the electrical contact of FIG. 45.
Figure 50:
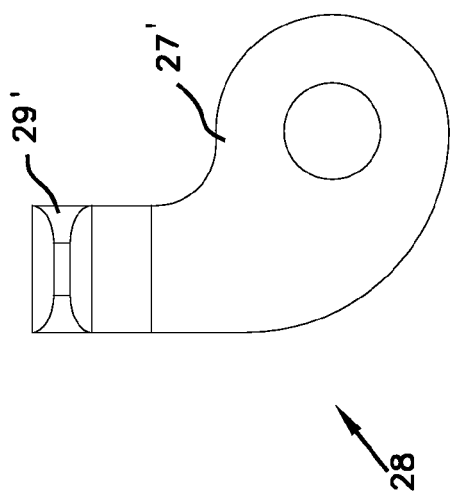
FIG. 50 is an insertion side plan view of the electrical contact of FIG. 45.
Figure 51:
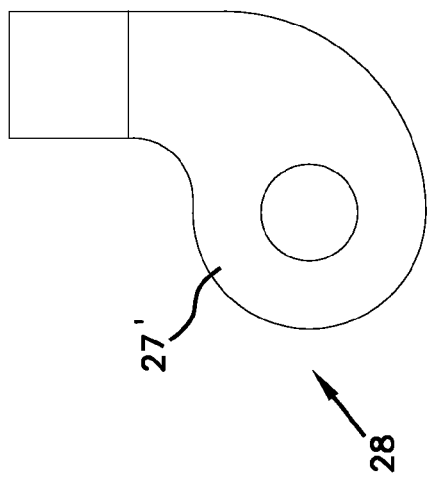
FIG. 51 is a side plan view of the electrical contact of FIG. 45, opposite the insertion side.
Figure 52:
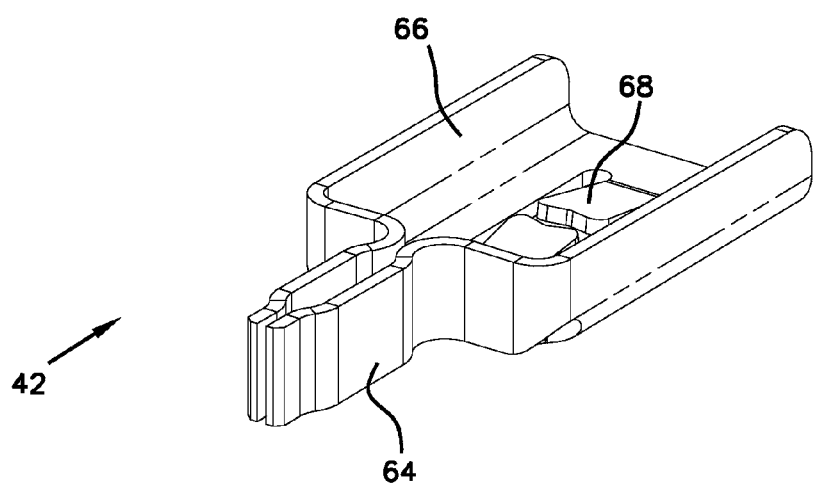
FIG. 52 is a perspective view of a grounding plate useable in the overvoltage protection plug of FIG. 1.
Figure 53:
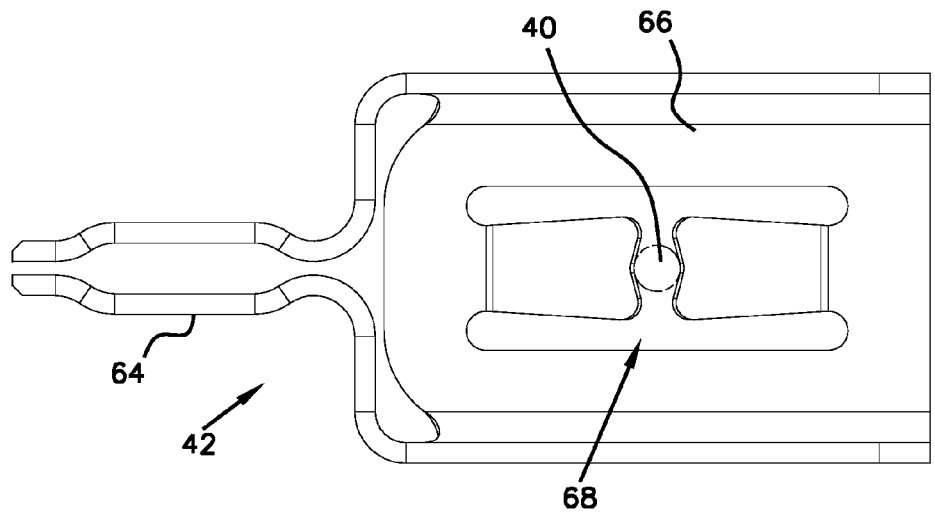
FIG. 53 is a top plan view of the grounding plate of FIG. 52.
Figure 54:
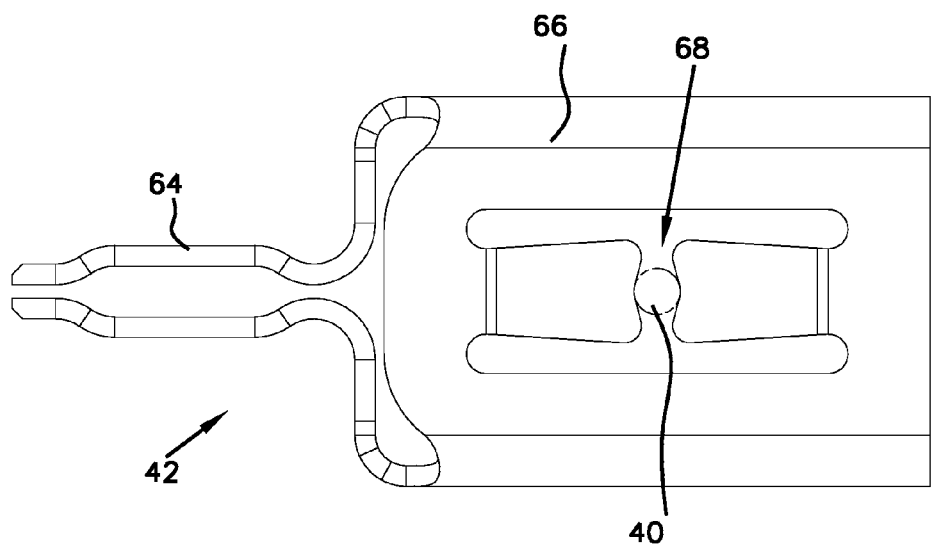
FIG. 54 is a bottom plan view of the grounding plate of FIG. 52.
Figure 55:
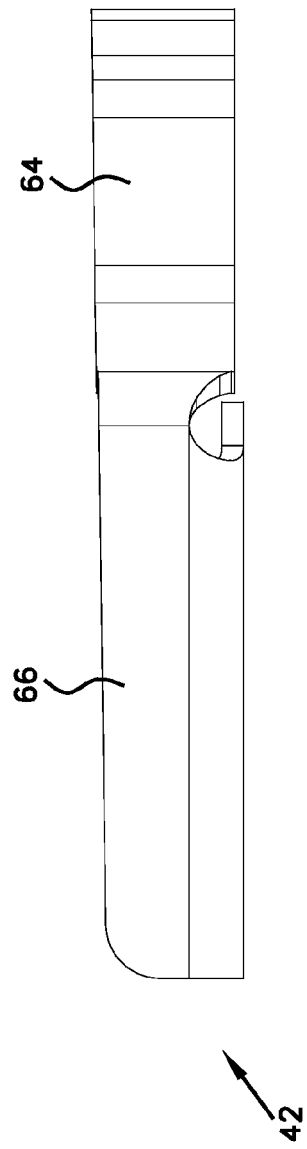
FIG. 55 is a left side plan view of the grounding plate of FIG. 52.
Figure 56:
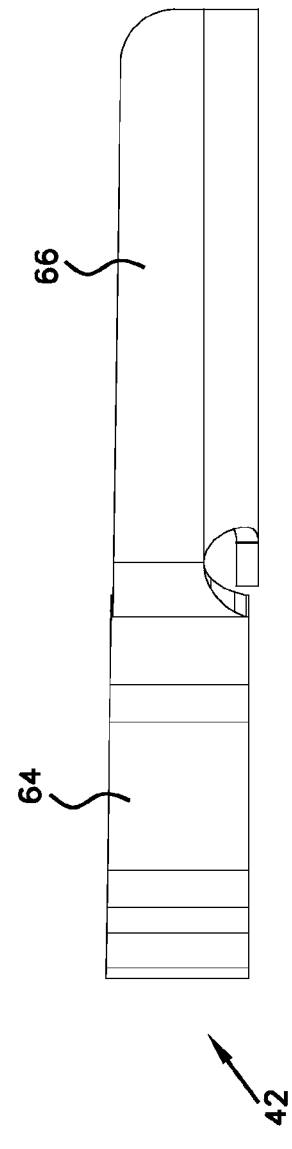
FIG. 56 is a right side plan view of the grounding plate of FIG. 52.
Figure 57:
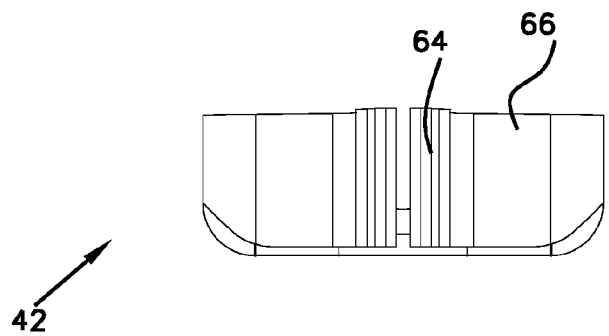
FIG. 57 is an insertion side plan view of the grounding plate of FIG. 52.

Referring to FIGS. 1-8, an overvoltage protection plug 10 is disclosed. The plug 10 provides overvoltage protection for telecommunications circuits, such as due to lightning strikes, power surges, or other unexpected events occurring within the telecommunications circuits. The plug 10 is configured for insertion into a connection block, such as a Krone-style connection block widely used in telecommunication interconnection systems, which include an array of connection locations and can be arranged in a number of adjacent rows.

The plug 10 includes a body 12 formed from a chassis 14 and a housing 16. The body 12 has a top 13, bottom 15, right and left sides 18, 20, respectively. The body 12 also defines an insertion side 22 and a handle side 24 at opposite sides along its length. The size of the body 12 is minimized, at least with respect to the dimensions from the top 13 to bottom 15 and right to left (sides 18 and 20, respectively). This maximizes the circuit density of connection blocks in which the plug can be located. In one possible embodiment, the body 12 is approximately 0.31 inches wide by approximately 0.49 inches tall by approximately 1.44 inches long.

In the embodiment shown, two conductive contacts 26, 28 extend through the body at the insertion side 22, and are positioned to make contact with and electrically connect to electrical contacts in a high contact density connection block, such as a Krone-style connection block. Example Krone-style blocks useable in conjunction with the plug 10 are disclosed in German Patent No. DE3728368 and German Patent Application No. DE10001553. Additional details are described in U.S. Pat. Nos. 7,147,412; 7,008,243; 5,494,461; 5,163,855; 5,033,974; and 4,871,330, the disclosures of which are hereby incorporated by reference in their entireties.

The chassis 14 and housing 16 interconnect to form the body 12 via a snap-fit arrangement, in which tabs 30 arranged on a portion of the chassis inserted into the housing fit within openings 32 in the housing. Other arrangements for interconnecting the chassis 14 and housing 16 are possible as well, such as use of an adhesive, fastener, or other structure. Additional details of the chassis and housing are discussed below in conjunction with FIGS. 19-32.

Referring now also to FIGS. 9-18, further details regarding the overvoltage protection plug 10 are disclosed. As shown, the plug 10 includes an interior volume 34 in which electrical components, such as circuit protection components, can be housed. In the embodiment shown, the plug 10 includes a gas tube 36 residing within the interior volume 34. The gas tube 36 is generally a three pin gas tube, having two signal leads 38 and a grounding pin 40. The gas tube 36 generally activates upon detection of overvoltage events occurring between the conductive contacts. When the gas tube 36 activates, an electrical connection forms due to electrical excitement of the gas within the gas tube, connecting one or both of the signal leads 38 of the gas tube (connected to the electrical contacts) to the grounding pin 40, thereby neutralizing the overvoltage event. Additional details regarding the gas tube are described below in conjunction with FIGS. 33-37.

The gas tube 36 is electrically connected to the conductive contacts 26, 28. In the embodiment shown, the conductive contacts 26, 28 can be electrically connected to the signal leads 38 of the gas tube via a soldered connection; however, solderless connection arrangements are possible as well.

The gas tube 36 also electrically connects to a grounding plate 42. The grounding plate 42 is held apart from the gas tube 36 by a portion of the chassis 14, which allows the grounding pin 40 of the gas tube 36 to slide through the chassis to a mounting position. A grounding opening 44 in the body 12 allows external access to the grounding plate, to allow electrical connection of the grounding plate to a ground bar, such as a grounding bar associated with a connection block.

A gel access opening 46 extends through the body 12 as well. The gel access opening 46 allows access to the interior volume 34 of the plug 10. A gel can be added into the interior volume 34 to environmentally protect components within the interior volume 34. The gel access opening 46 generally allows gel to be provided into the interior volume 34 to a predetermined volume, such as the predetermined fill level 41 shown in FIG. 16. As the temperature of the gel increases due to operation of the overvoltage protection plug 10, the gel access opening 46 also allows the gel to expand through the opening. In the embodiment shown, the gel access opening 46 passes through the chassis 14 at the insertion side 22 of the plug 10; in other embodiments, the gel access opening 46 can be located at another location on the body 12, such as through a portion of the housing 16.

Referring now to FIGS. 19-25, further details are disclosed regarding the chassis 14 useable in the example overvoltage protection plug. The chassis 14 includes an insertion portion 48 that is configured to be inserted into a protection block. The insertion portion 48 includes a plurality of protrusions 47 configured to interconnect with a connection block and retain the overvoltage protection plug 10 within the block. The chassis 14 also includes an interior portion 50 that resides within the housing 16 and is configured to allow mounting of electrical components, such as the gas tube 36, grounding plate 42, and conductive contacts 26, 28. The interior portion 50 includes tabs 30 along a perimeter portion arranged to interconnect with the openings 32 in the housing to form a snap-fit construction. In the embodiment shown, two tabs 30 are located on the left and right sides of the chassis 14; however, more or fewer tabs can be included on the chassis 14 as well.

The chassis 14 includes slots 52 extending through the chassis 14 from the interior portion 50 toward left and right sides of the insertion portion 48. The slots 52 are sized to receive the conductive contacts 26, 28, which are exposed at the insertion portion 48 external to the body 12 while electrically connecting to the gas tube 34 within the interior volume 34. The insertion portion 48 also includes a central guide extension 49 that physically and electrically separates the conductive contacts 26, 28.

The chassis also includes a central pin receiving slot 54 normal to the slots 52 and arranged to accept insertion of the grounding pin 40 of the gas tube 36, for connection to the grounding plate 42. Tabs 56 on a top side of the chassis 14 define a mounting location for the grounding plate, and retain the grounding plate 42 in place when the overvoltage protection plug 10 is assembled. In the embodiment shown, the chassis 14 includes the gel access opening 46 located below the insertion portion 48, as previously described.

Referring now to FIGS. 26-32, aspects of the housing 16 are described in greater detail. The housing 16 defines a portion of the body 12 including at least a portion of the left and right sides 18, 20 of the body as well as the handle side 24 of the body. The housing 16 defines the interior volume 34, and includes an opening 35 that is sized to receive the chassis 14 and associated internal electrical components (e.g. a gas tube 36, grounding plate 42, and conductive contacts 26, 28). In the embodiment shown, the housing 16 is generally rectangular, but includes angled corners 58 connecting the bottom side 15 to the left and right sides 18, 20, respectively, to ensure consistent, proper orientation of the overvoltage protection plug when inserted into a socket or connection block. An example connection block used in conjunction with such a keyed housing is disclosed in U.S. patent application Ser. No. 12/429,850, filed on Apr. 24, 2009, which is hereby incorporated by reference in its entirety.

The housing 16 includes tab receiving openings 32 near the opening 35 that are configured to receive the tabs 30 of the chassis to form a snap-fit connection. The openings 32 are generally numbered and positioned in a manner complementary to the tabs 30, such that each tab has a corresponding opening.

The housing 16 defines a handle 60 shaped to be manually gripped for insertion and removal of the overvoltage protection plug 10 from a socket, connection block, or other insertion location. The handle 60 includes a plurality of ridges 61 to assist with manual gripping of the plug 10. The handle 60 can also be shaped to accept use of a punch down tool for insertion or removal of the plug 10. For example, the handle can include a hook-shaped portion for receiving a portion of such a tool. The punch down tool (not shown) can be used to insert or remove the overvoltage protection plug 10, due in part to the sizing and positioning of the handle 60 at the handle portion of the housing 16, extending rearwardly from the plug. As described above, an example punch down tool can be any of a variety of tools include a gripping portion (for example, a hook), such as a punch down tool distributed by ADC Krone GmbH. An example punch down tool is described in U.S. Pat. No. 4,434,542, the disclosure of which is hereby incorporated by reference in its entirety.

Referring now to FIGS. 33-37, additional details of the gas tube 36 are shown. The gas tube 36 is a three-pin gas tube, and, as previously mentioned, includes two signal leads 38 and a grounding pin 40. The gas tube 36 is generally cylindrical, and the signal leads 38 extend from opposing ends of the cylinder. The grounding pin 40 extends from a central location along the cylindrical shape of the gas tube 36.

The gas tube 36 can be any of a variety of sizes. In various embodiments, the gas tube 34 is a gas discharge tube rated to meet electrical specifications of Underwriter's Laboratories, Telcordia, or another electrical safety specification appropriate to the region in which the plug 10 is used. Such gas discharge tubes can be any of a number of gas tubes manufactured by Bourns or other gas discharge tube manufacturer. In the embodiment shown, the gas tube has a diameter of approximately 5 mm. However, other sizes of gas tubes may be used as well to ensure that the necessary electrical specifications are met for use of the plug 10.

Optionally, the gas tube 36 includes a melt element 62 along the length of the tube. The melt element operates to permanently connect the signal leads 38 to the grounding pin 40 if a prolonged overvoltage event is detected. In the case of such an event, the gas tube 36 is activated for a long period of time, causing the temperature of the gas tube to rise, melting the melt element and causing a short circuit between the signal leads 38 and the grounding pin 38.

Now referring to FIGS. 38-51, features of the conductive contacts 26, 28 are described. A first conductive contact 26, shown in FIGS. 38-44, connects from the signal lead 38 of the gas tube 36 that resides within the housing 16 nearer to the handle 60, and extends through the chassis 14 to be exposed along the right side of the insertion portion. The conductive contact 26 includes a connection portion 27 configured for electrical connection to a signal lead 38 from the gas tube 36, and a lead portion 29 configured to extend through the slot 54 in the chassis. The second conductive contact 28, shown in FIGS. 45-51, includes a corresponding connection portion 27' and lead portion 29' connects from the signal lead 38 of the gas tube 36 that is nearer to the insertion portion through the chassis, and is exposed along the left side of the insertion portion. The conductive contacts 26, 28 can be soldered or otherwise electrically connected to the signal leads 38 using the connection portions 27, 31.

FIGS. 52-58 illustrate additional details of the grounding plate 42 mounted to the chassis 14 within the body 12. The grounding plate 42 includes a grounding extension 64 connected to a connection portion 66, which includes a connection location 68 for electrically connecting the grounding plate to the grounding pin 40 of the gas tube 36. In the embodiment shown, the connection portion is substantially rectangular, to be held in place by the tabs 56 on the top side of the chassis. In the embodiment shown, the connection location 68 includes an H-clip configuration, forming a solderless electrical connection to the grounding pin 40 of the gas tube 36. However, in other embodiments a soldered connection could be used instead.

Referring now to the disclosure generally, to construct an overvoltage protection plug 10 such as is disclosed herein, an example process follows. A manufacturer can mount a gas tube to a chassis, such as by sliding one or more pins of the gas tube (e.g. the grounding pin 40 or signal leads 38) into a slot of the chassis arranged to accommodate the gas tube. Metallic leads, such as the conductive contacts 26, 28, are electrically connected to the signal leads 38 of the gas tube 36, and inserted through slots in the chassis to extend toward an insertion side of the chassis. For example, the conductive contacts 26, 28 can be soldered to the signal leads 38 of the gas tube 36.

A grounding plate 42 is electrically connected to the grounding pin 40 of the gas tube 36. The grounding plate is installed over the grounding pin, optionally such that a portion of the chassis 14 resides between the grounding plate 42 and the gas tube 36.

The interior portion 50 of the chassis 14, including the installed gas tube 36, grounding plate 42, and portions of the conductive contacts 26, 28, is inserted into the housing 16 to form a snap-fit connection, forming the overvoltage protection plug 10. The interior volume of the formed plug 10 can be filled with a gel, such as by inserting the gel through a gel access opening in the body 12 of the plug. The gel surrounds the grounding plate 42, conductive contacts 26, 28, and gas tube 36, to environmentally protect the electrical components from moisture or other harmful external conditions.

In operation, the overvoltage protection plug 10 is inserted into a connection block, thereby connecting two sets of contacts for a differential signal pair routed through the connection block. The overvoltage protection plug 10 detects overvoltage events, representing instances in which the voltage difference across the differential pair exceeds an acceptable, preset threshold value. When the voltage difference exceeds this threshold value (as determined by the specific voltage characteristics of the selected gas tube), one or both of the signal leads of the gas tube are shorted to the grounding pin of the gas tube, as described above in conjunction with FIGS. 33-37, thereby protecting an overall differential signaling circuit.

One example of a similar overvoltage protection plug that has analogous functionality is described in U.S. patent application Ser. No. 11/712,234, filed Feb. 28, 2007, and entitled "Overvoltage Protection Plug", the entire disclosure of which is hereby incorporated by reference in its entirety.

Now referring to FIGS. 59-66, certain optional additional features for an alternative construction of an overvoltage protection plug 100 are shown. The overvoltage protection plug 100 generally includes corresponding features and functionality to plug 10 of FIGS. 1-58, and further includes test access openings in the housing 14 and chassis 16. The test access openings, described in further detail below, allow access to signals protected by plug 100 by a technician (e.g., while the plug is installed in a connection block).

Figure 58:
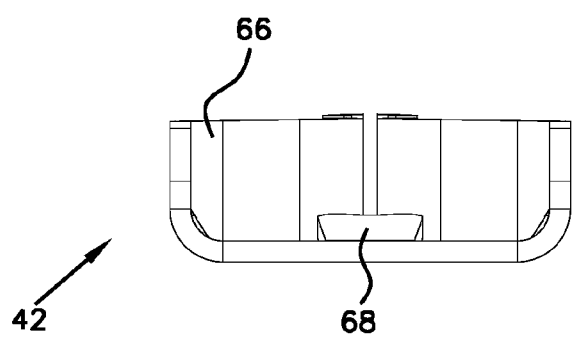
FIG. 58 is a further side plan view of the grounding plate of FIG. 52, opposite the insertion side.
Figure 59:
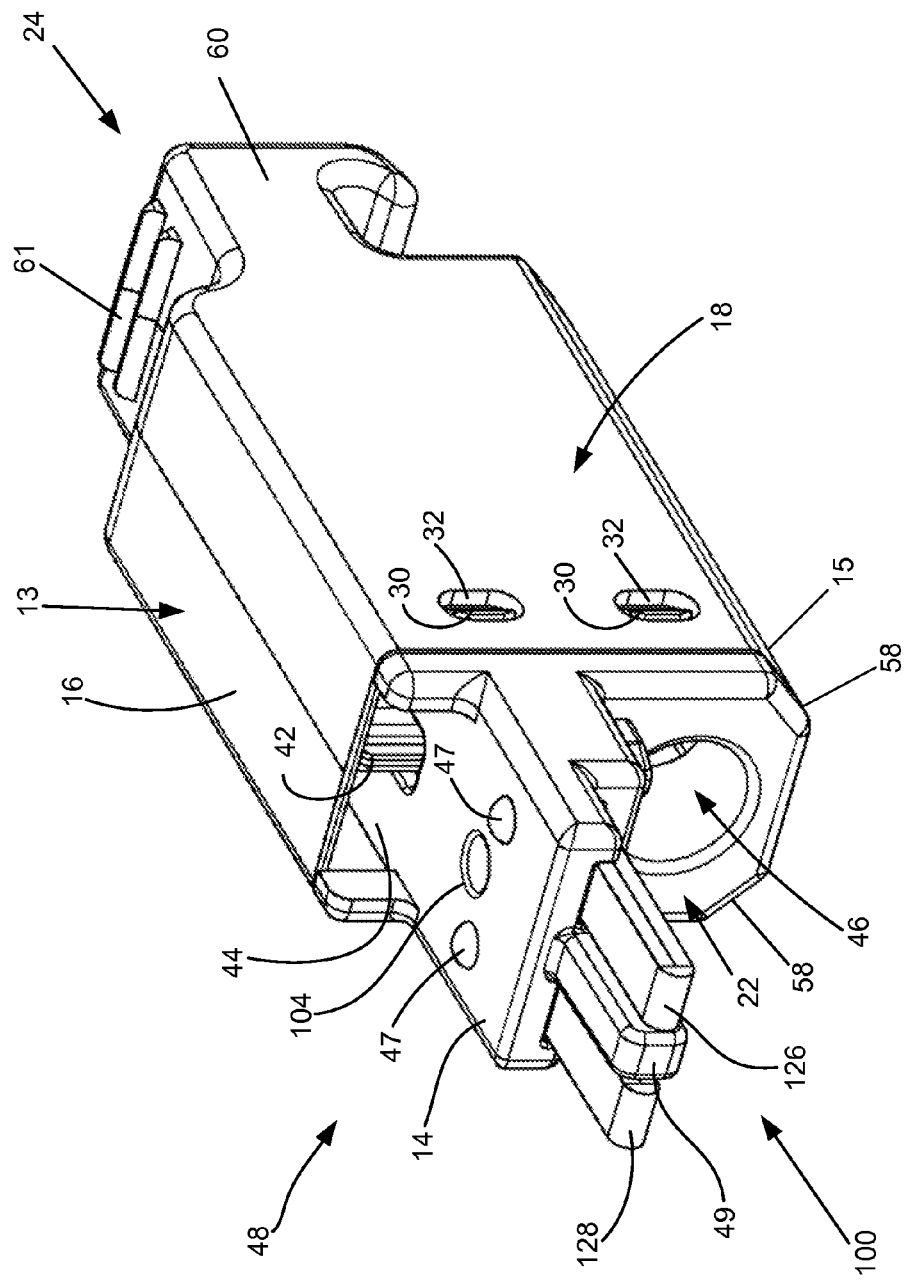
FIG. 59 is a right side perspective view of an overvoltage protection plug, in accordance with a further possible embodiment of the present disclosure.
Figure 60:
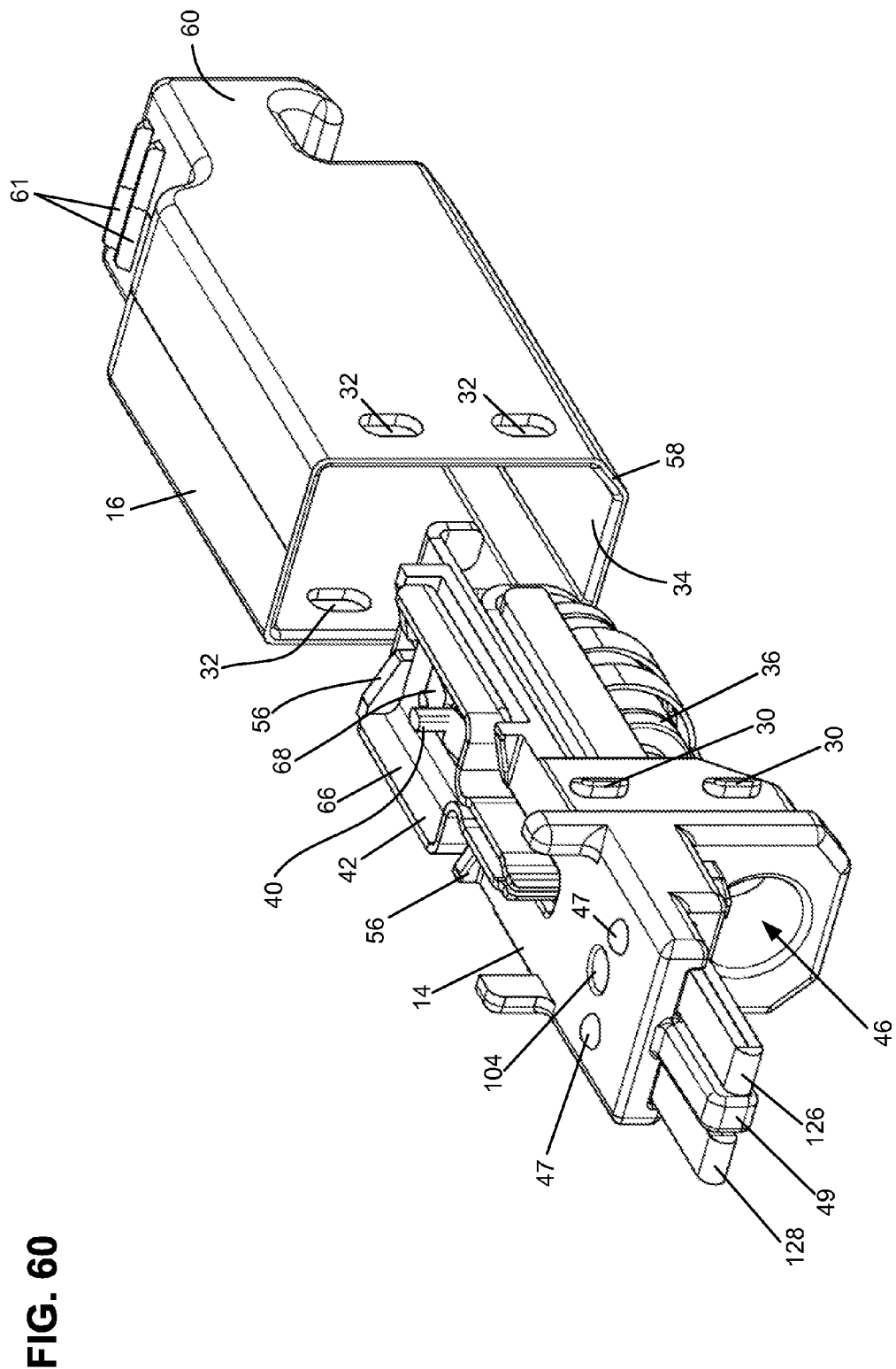
FIG. 60 is a right side partially exploded view of the overvoltage protection plug of FIG. 59, illustrating insertion of a chassis into a housing.
Figure 61:
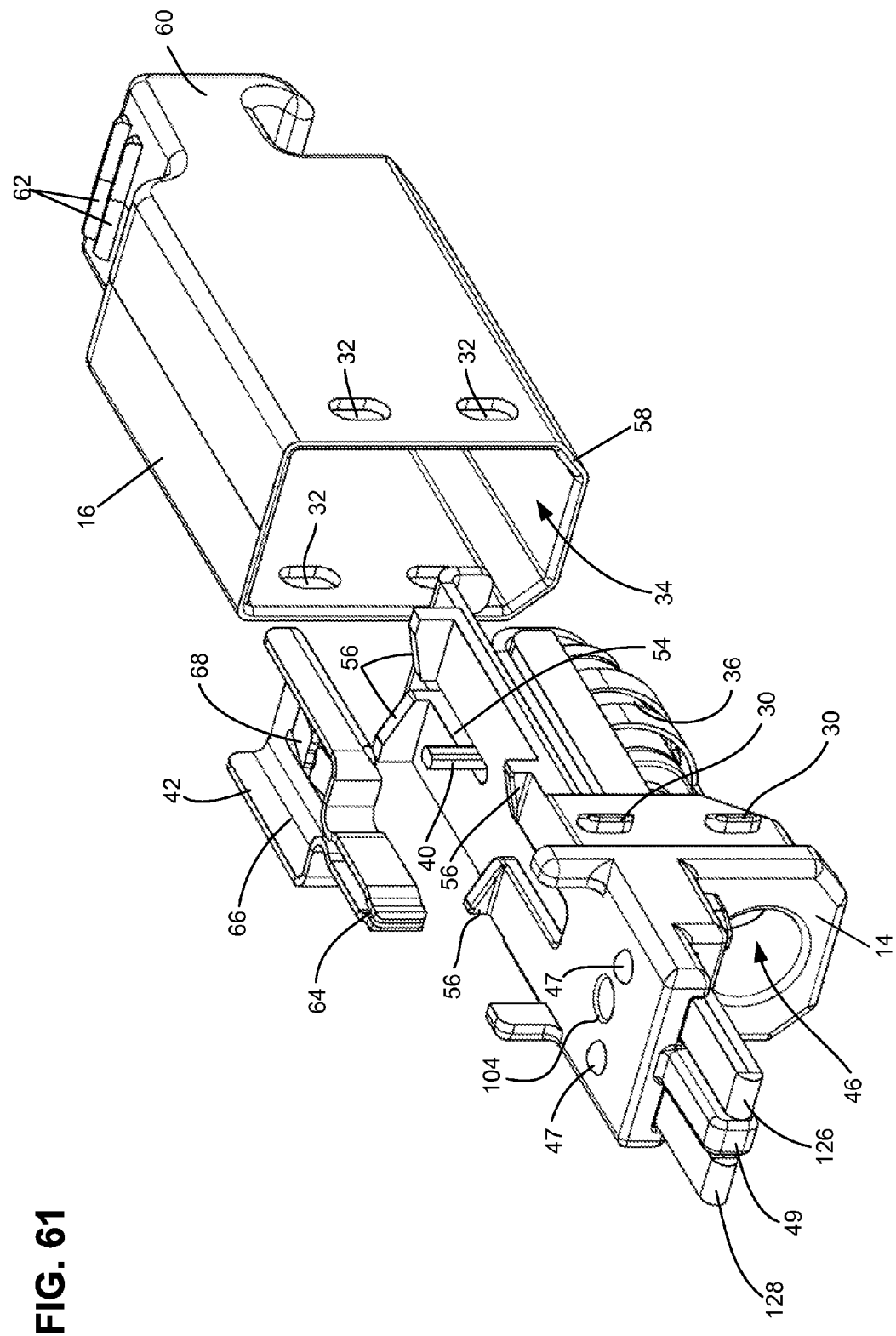
FIG. 61 is a right side partially exploded view of the overvoltage protection plug of FIG. 59, illustrating connection of a grounding plate within the plug.
Figure 62:
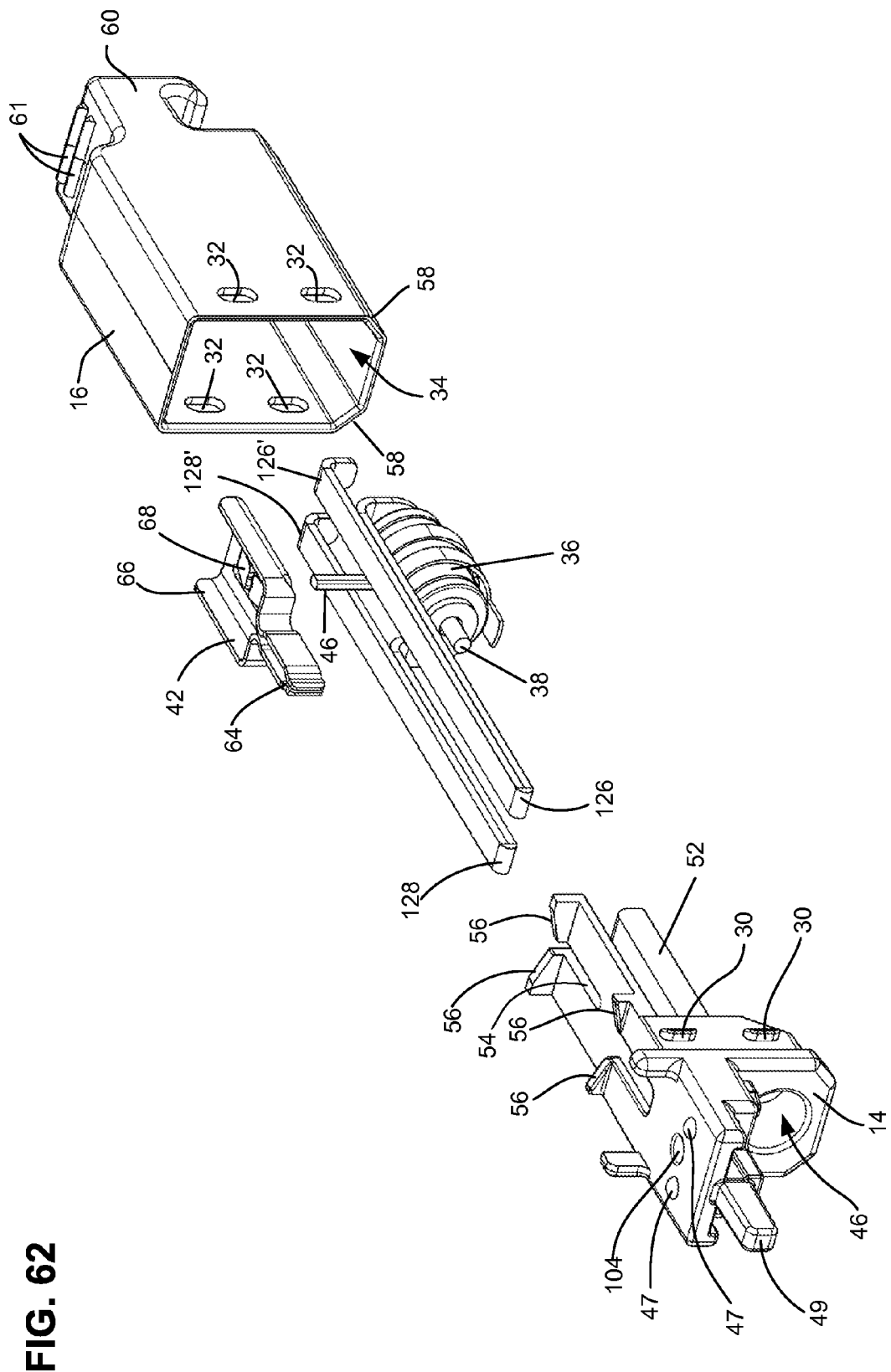
FIG. 62 is a right side perspective exploded view of the overvoltage protection plug of FIG. 59.
Figure 63:
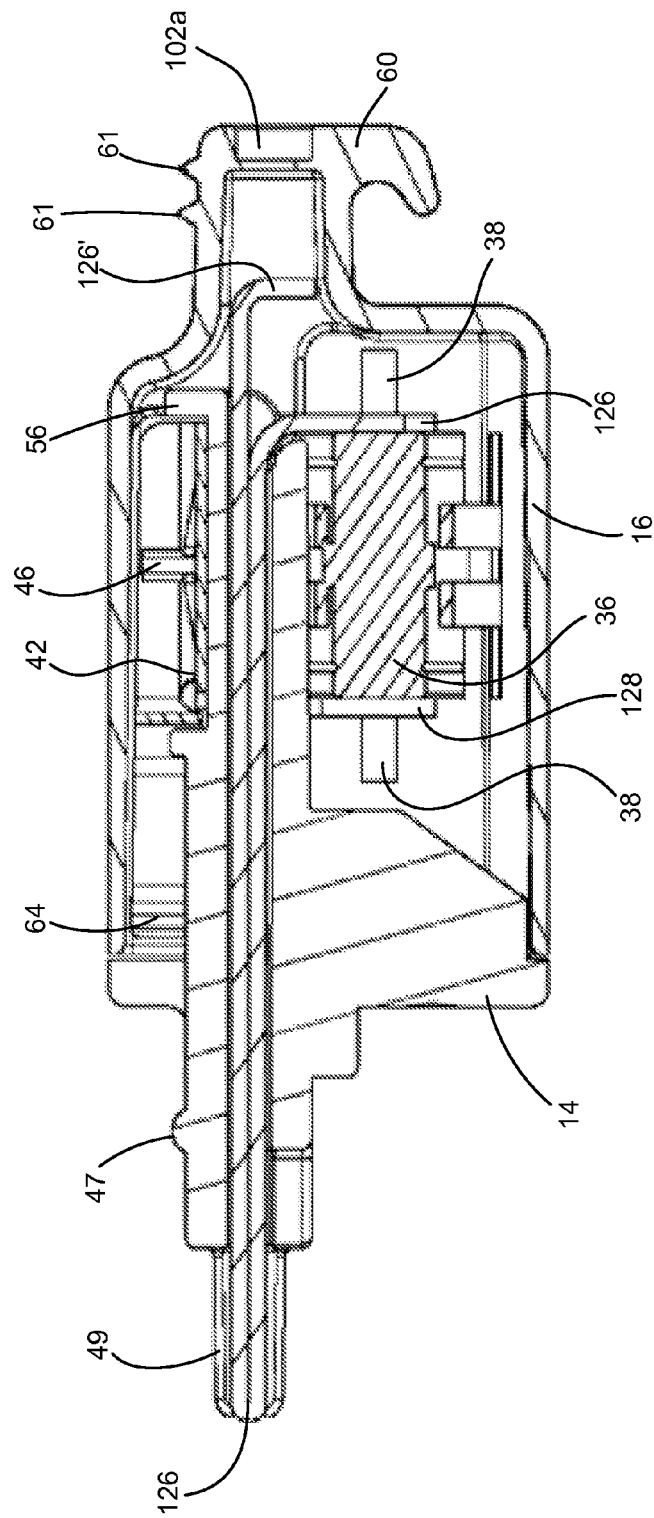
FIG. 63 is a cross-sectional view of the overvoltage protection plug of FIG. 59 along corresponding axis B as illustrated in FIG. 15.

In the embodiment shown, contacts 126, 128 replace contacts 26, 28 of FIGS. 1-58, and include test access lead portions 126', 128', respectively, extending to the handle side of the interior volume 34 of the housing 14. In the embodiment shown, the test access lead portions 126', 128' are formed from an elongated metal contact folded upon itself and extending to the handle side 24 of the plug 100 (as compared to contacts 26, 28). A pair of test access openings 102*a-b* are located in the handle 60 of the housing 14, and allow a technician to access contacts 126, 128 and monitor signals thereon.

Additionally, a ground access opening 104 is located through the chassis 16 proximate to the protrusions 47, and allows connective test access to a grounding bar connected to the grounding plate 42 when the plug 100 is inserted into a connection block. In the embodiment shown, the ground access opening 104 extends through the chassis such that grounding access is available from either side of the plug 100.

Although certain particular methods of construction and operation of an overvoltage protection plug are described herein, other methods of construction and operation are possible as well. Furthermore, the various steps described to construct an overvoltage protection plug are not required to be performed in a specific order, and no order is imputed by this description.

Furthermore, it is noted that, although in the foregoing description of the overvoltage protection plug 10 terms such as, "top", "bottom", and "side" and words related thereto are used for ease of description and illustration, no restriction is intended by use of such terms. The plug 10 can be positioned in any orientation.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An overvoltage protection plug comprising:
   a protection plug body formed from a chassis and a housing and defining an interior volume, the chassis defining a side of the body including an insertion portion and the housing interconnectable to the chassis and including a handle and a gel access opening;
   a gas tube located within the interior volume, the gas tube includes metallic leads electrically connected to conductive contacts within the interior volume, the conductive contacts protruding through the body at the insertion portion;
   a grounding plate electrically connected to a ground pin of the gas tube; and
   a gel at least partially surrounding the gas tube within the interior volume.

2. The overvoltage protection plug of claim 1, wherein the gel is arranged to protect the gas tube from environmental conditions surrounding the overvoltage protection plug.

3. The overvoltage protection plug of claim 1, wherein the grounding plate includes a solderless connection to the ground pin formed from an H-clip connection.

4. The overvoltage protection plug of claim 1, wherein the gas tube is mounted to a portion of the chassis extending into the interior volume.

5. The overvoltage protection plug of claim 4, wherein the grounding plate is electrically connected to a ground pin of the gas tube, the grounding plate separated from the gas tube by the portion of the chassis extending into the interior volume.

6. The overvoltage protection plug of claim 1, wherein the gas tube includes a melt element constructed to form a permanent connection between the metallic leads and a ground pin upon prolonged exposure to an overvoltage event.

7. The overvoltage protection plug of claim 1, wherein the metallic leads protrude through slots in the chassis.

8. The overvoltage protection plug of claim 1, wherein the body has a nonsymmetrical shape to prevent misalignment with a connection block.

9. The overvoltage protection plug of claim 1, wherein the gas tube is approximately 5 millimeters in diameter.

10. The overvoltage protection plug of claim 1, wherein the chassis and the housing connect to form the body via a snap-fit construction.

11. The overvoltage protection plug of claim 1, further comprising a test access opening in the housing and positioned to provide access to at least one of the conductive contacts.

12. The overvoltage protection plug of claim 1, further comprising a ground access opening in the chassis.

13. A method of assembling an overvoltage protection plug, the method comprising:
    mounting a gas tube to a chassis;
    electrically connecting the gas tube to metallic leads, the metallic leads extending through the chassis; and
    inserting at least a portion of the chassis into a housing to form a body for the overvoltage protection plug, the body including an interior volume, and wherein the gas tube resides within the interior volume and the metallic leads extending through the chassis and are exposed external to the body, and wherein the chassis forms part of the enclosure; and
    at least partially filling the interior volume with gel via an access opening, thereby surrounding the gas tube with the gel and environmentally protecting the interior volume of the overvoltage protection plug.

14. The method of claim 13, further comprising soldering metallic leads to the gas tube.

15. The method of claim 13, further comprising connecting a grounding plate to a grounding pin of the gas tube.

16. The method of claim 13, wherein inserting at least a portion of the chassis into a housing to form a body comprises forming a snap-fit connection between the chassis and the housing.

17. An overvoltage protection plug comprising:
    a protection plug body formed from a chassis and a housing and defining an interior volume, the protection plug body including an insertion portion and a handle, the body including a gel access opening;
    a gas tube located within the interior volume;
    a plurality of metallic leads electrically connected to the gas tube, the plurality of metallic leads extending through slots in the chassis for electrical connection to a connection block;
    a grounding plate electrically connected to a grounding pin of the gas tube; and
    a gel surrounding the gas tube within the interior volume and arranged to protect the gas tube from environmental conditions surrounding the overvoltage protection plug.

18. The overvoltage protection plug of claim 17, wherein the grounding plate includes an electrical connection portion configured for connection to a grounding bar.

19. The overvoltage protection plug of claim 17, wherein the gas tube is configured to protect against overvoltage events.

20. The overvoltage protection plug of claim 17, wherein the chassis and the housing connect to form the body via a snap-fit construction.

21. The overvoltage protection plug of claim 17, wherein the body has a non-symmetrical shape to prevent misalignment with a connection block.

22. The overvoltage protection plug of claim 17, further comprising a gel access opening in the chassis.

23. The overvoltage protection plug of claim 17, further comprising a test access opening in the housing and positioned to provide access to a test access lead of at least one of the conductive contacts.

24. The overvoltage protection plug of claim 17, further comprising a ground access opening in the chassis.

25. The overvoltage protection plug of claim 17, wherein the gel access opening is positioned through the chassis.

26. An overvoltage protection plug comprising:
a protection plug body formed from a chassis and a housing and defining an interior volume, the protection plug body including an insertion portion and a handle; and
a gas tube located within the interior volume, the gas tube including electrically connected to conductive contacts within the interior volume, the conductive contacts protruding through the body at the insertion portion; and
a gel surrounding the gas tube within the interior volume and arranged to protect the gas tube from environmental conditions;
wherein the protection plug body includes a gel access opening for providing access to the interior volume.

27. The overvoltage protection plug of claim 26, wherein the gel access opening provides access to the interior volume through the chassis.

28. An overvoltage protection plug comprising:
a chassis including an insertion portion arranged to be received into a connection block, the chassis including:
a plurality of slots arranged to receive conductive leads, the slots extending through the chassis and oriented toward the insertion portion;
a grounding pin slot arranged to receive a grounding pin of a gas tube;
a guide member located between the slots and extending from the insertion portion;
a plurality of tabs defining a grounding plate mounting location on a top side of the chassis; and
a gel access opening extending through the chassis,
a gas tube mounted to the chassis; and
gel, the gel being in contact with the gas tube;
wherein the chassis defines a side of a body of the overvoltage protection plug.

29. The overvoltage protection plug of claim 28, wherein the gas tube includes a grounding pin extending through the grounding pin slot extending through the chassis from a bottom side to the grounding plate mounting location.

30. The overvoltage protection plug of claim 29, further comprising a grounding plate placed at the grounding plate mounting location and electrically connected to the grounding pin.

31. The overvoltage protection plug of claim 28, wherein the tabs are arranged to maintain the position of the grounding plate.

32. A method of assembling an overvoltage protection plug, the method comprising:
electrically connecting each of a plurality of signal posts of a gas tube to conductive leads, the gas tube also including a grounding pin;
sliding the conductive leads through slots in the chassis;
electrically connecting a grounding plate to the grounding pin on a side of the chassis opposite the gas tube;
inserting at least a portion of the chassis into a housing to form a snap-fit connection, the chassis and housing forming a body for the overvoltage protection plug;
filling an interior volume of the overvoltage protection plug with gel through a gel access opening in the chassis, wherein the gel becomes in contact with the gas tube and wherein the gel is arranged to protect the gas tube from environmental conditions.

33. The method of claim 32, wherein filling the interior volume comprises filling the interior volume of the overvoltage protection plug to a predetermined level less than the entire interior volume.

34. The overvoltage protection plug of claim 1, wherein the gel access opening is positioned through the chassis.

* * * * *